United States Patent
Lee et al.

(10) Patent No.: US 11,709,565 B2
(45) Date of Patent: *Jul. 25, 2023

(54) FINGERPRINT SENSING APPARATUS, FINGERPRINT READOUT CIRCUIT, AND TOUCH DISPLAY PANEL

(71) Applicant: Novatek Microelectronics Corp., Hsinchu (TW)

(72) Inventors: Yu-Hsien Lee, Taoyuan (TW); Ting-Hsuan Hung, Hsinchu (TW); Feng-Lin Chan, Hsinchu County (TW); Wu Wei Lin, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,611

(22) Filed: Dec. 22, 2021

(65) Prior Publication Data
US 2022/0197469 A1      Jun. 23, 2022

Related U.S. Application Data

(60) Provisional application No. 63/129,612, filed on Dec. 23, 2020.

(51) Int. Cl.
*G06F 3/041*      (2006.01)
*G06V 40/13*      (2022.01)

(52) U.S. Cl.
CPC ........ *G06F 3/04166* (2019.05); *G06F 3/0412* (2013.01); *G06F 3/04164* (2019.05); *G06V 40/13* (2022.01)

(58) Field of Classification Search
None
See application file for complete search history.

(56) References Cited

U.S. PATENT DOCUMENTS

| | | | |
|---|---|---|---|
| 2005/0212916 A1* | 9/2005 | Nakamura | G06F 3/0412 348/207.99 |
| 2012/0001880 A1* | 1/2012 | Brown | G09G 3/20 345/207 |

(Continued)

FOREIGN PATENT DOCUMENTS

| | | |
|---|---|---|
| TW | 202006520 | 2/2020 |
| TW | M604434 | 11/2020 |

OTHER PUBLICATIONS

"Office Action of Taiwan Counterpart Application", dated Nov. 25, 2022, p. 1-p. 14.

*Primary Examiner* — Krishna P Neupane
(74) *Attorney, Agent, or Firm* — JCIPRNET

(57) ABSTRACT

A fingerprint sensing apparatus includes a plurality of fingerprint sensors and a fingerprint readout circuit. The fingerprint sensors may be configured to operate in a fingerprint sensing cycle. The fingerprint readout circuit may be coupled to the plurality of fingerprint sensors via a plurality of sensing lines. The fingerprint readout circuit may be configured to control the fingerprint sensors to operate in the fingerprint sensing cycle. The fingerprint sensing cycle includes an initialization period, an exposure period and a readout period. A voltage of a reset node in each fingerprint sensor among the plurality of fingerprint sensors is reset to a first voltage in a reset period after the fingerprint sensing cycle ends. The voltage of the reset node in each fingerprint sensor is initialized to an initial voltage in the initialization period. The initial voltage is different from the first voltage.

42 Claims, 18 Drawing Sheets

(56) References Cited

U.S. PATENT DOCUMENTS

| | | | |
|---|---|---|---|
| 2012/0223925 A1* | 9/2012 | Yamamoto | G01J 1/46 250/206 |
| 2013/0093927 A1* | 4/2013 | Yamada | H04N 5/35554 348/241 |
| 2013/0162602 A1* | 6/2013 | Nakagawa | G06F 3/042 345/175 |
| 2022/0070394 A1* | 3/2022 | Jun | H04N 5/3765 |

* cited by examiner

FINGERPRINT SENSING APPARATUS, FINGERPRINT READOUT CIRCUIT, AND TOUCH DISPLAY PANEL

CROSS-REFERENCE TO RELATED APPLICATION

This application claims the priority benefit of U.S. provisional patent application Ser. No. 63/129,612, filed on Dec. 23, 2020. The entirety of the above-mentioned patent application is hereby incorporated by reference and made a part of this specification.

BACKGROUND

Technical Field

The disclosure relates to fingerprint sensing; particularly, the disclosure relates to a fingerprint sensing apparatus, a fingerprint readout circuit, and a touch display panel.

Description of Related Art

Fingerprint recognition is a commonly used technology for security protection. In order to reduce the size reduction of electronic products and increase convenience, an optical fingerprint sensor array is often integrated in a touch display panel. However, due to the in-display fingerprint sensor structure, remaining voltages in the circuit of fingerprint sensors which performs fingerprint sensing cycles may affect display common electrodes used as touch sensing electrodes. The touch sensing data got in one or more touch display frame periods subsequent to a fingerprint sensing frame period may be higher or lower than expected touch sensing data which is got in touch display frame periods far from the fingerprint sensing frame period. That is, after the fingerprint sensing frame period, the touch sensing data may return to the expected regular values only after several touch display frame periods passed. A consequence of this phenomenon is the error rate of the touch position detection raises, and the user experience decreases.

SUMMARY

The disclosure is direct to a fingerprint sensing apparatus, a fingerprint readout circuit, and a touch display panel, especially to a fingerprint sensing apparatus, a fingerprint readout circuit, and a touch display panel embedded with in-display fingerprint sensor structure, so as to improve the accuracy of touch sensing data.

In the disclosure, the fingerprint sensing apparatus includes a plurality of fingerprint sensors and a fingerprint readout circuit. The fingerprint sensors may be configured to operate in a fingerprint sensing cycle. The fingerprint readout circuit may be coupled to the plurality of fingerprint sensors via a plurality of sensing lines. The fingerprint readout circuit may be configured to control the fingerprint sensors to operate in the fingerprint sensing cycle. The fingerprint sensing cycle includes an initialization period, an exposure period and a readout period. A voltage of a reset node in each fingerprint sensor among the plurality of fingerprint sensors is reset to a first voltage in a reset period after the fingerprint sensing cycle ends. The voltage of the reset node in each fingerprint sensor is initialized to an initial voltage in the initialization period. The initial voltage is different from the first voltage.

In the disclosure, the fingerprint readout circuit, is configurable to be coupled to a touch display panel. The touch display panel may include a plurality of fingerprint sensors arranged in an array and a gate on array circuit. The fingerprint readout circuit may be coupled to the plurality of fingerprint sensors via a plurality of sensing lines. The fingerprint readout circuit may be coupled to the gate on array circuit. The fingerprint readout circuit may be configured to output at least one start pulse signal and at least one clock signal to control the gate on array circuit to output reset signals and selecting signals. The reset signals and the selecting signals may be configured to control at least one fingerprint sensing zone of the plurality of fingerprint sensors arranged in the array to operate in a fingerprint sensing cycle. The fingerprint sensing cycle may include an initialization period, an exposure period, and a readout period. According to the reset signals, a voltage of a reset node in each fingerprint sensor among the plurality of fingerprint sensors may be reset to a first voltage in a reset period after the fingerprint sensing cycle ends. The voltage of the reset node in each fingerprint sensor may be initialized to an initial voltage in the initialization period. The initial voltage is different from the first voltage.

In the disclosure, the touch display panel may include a plurality of sensing lines, a plurality of fingerprint sensors. The plurality of fingerprint sensors may be configured to operate in a fingerprint sensing cycle. The plurality of fingerprint sensors may be coupled to a fingerprint readout circuit via the sensing lines. The fingerprint sensing cycle includes an initialization period, an exposure period and a readout period. A voltage of a reset node in each fingerprint sensor among the plurality of fingerprint sensors may be reset to a first voltage in a reset period after the fingerprint sensing cycle ends. The voltage of the reset node in each fingerprint sensor may be initialized to an initial voltage in the initialization period. The initial voltage is different from the first voltage.

Based on the above, according to the fingerprint sensing apparatus, the fingerprint readout circuit, and the touch display panel of the disclosure, the reset period is arranged after the fingerprint sensing cycle to reset the voltage of the reset node of the fingerprint sensors. As a result, the touch sensing data becomes more accurate. Therefore, the error rate of the touch position detection is reduced and the user experience is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF EMBODIMENTS

Figure 1:
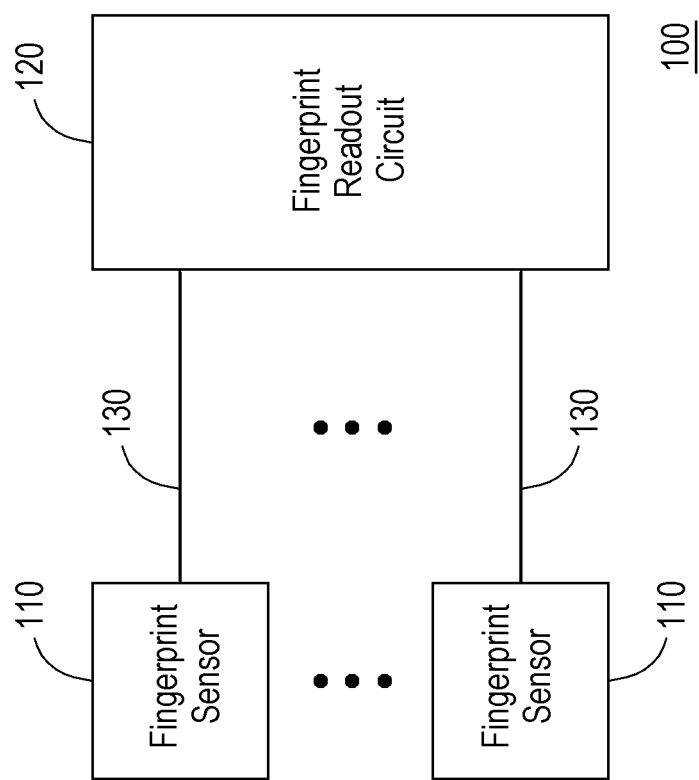
FIG. 1 is a schematic diagram of a fingerprint sensing apparatus according to one embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

FIG. 1 is a schematic diagram of a fingerprint sensing apparatus according to one embodiment of the disclosure. Referring to FIG. 1, a fingerprint sensing apparatus 100 may include a plurality of fingerprint sensors 110 as an optical fingerprint sensing array and a fingerprint readout circuit 120. The fingerprint sensing apparatus 100 may be an electronic device having a touch display panel embedded with the optical fingerprint sensing array, such as a mobile phone, a tablet computer, a notebook computer, and so on. The fingerprint readout circuit 120 may be implemented by an integrated circuit (IC) for only fingerprint sensing, or by a multi-functional IC of display driving, touch sensing and fingerprint sensing. Display common electrodes of the touch display panel are used as self-capacitive, in-cell touch sensing electrodes. The optical fingerprint sensing array and display pixel array are integrated on the same substrate. The fingerprint sensors 110 may be configured to operate in a fingerprint sensing cycle. The fingerprint readout circuit 120 may be coupled to the plurality of fingerprint sensors 110 via a plurality of sensing lines 130 in the touch display panel. The fingerprint readout circuit 120 may be configured to control the fingerprint sensors 110 to operate in the fingerprint sensing cycle. The fingerprint sensing cycle includes an initialization period, an exposure period and a readout period. A voltage VP of a reset node P in each fingerprint sensor among the plurality of fingerprint sensors 110 is reset to a first voltage in a reset period after the fingerprint sensing cycle ends. The voltage VP of the reset node P in each fingerprint sensor 110 is initialized to an initial voltage in the initialization period. The initial voltage is different from the first voltage.

In one embodiment, the reset node P is a node electrically coupled to a photo sensor of the fingerprint sensor 110. The voltage VP of the reset node P is reset to the first voltage after the fingerprint sensing cycle, and as a result, the touch sensing data becomes more accurate, and thereby reduces the error rate of the touch position detection.

Figure 2:
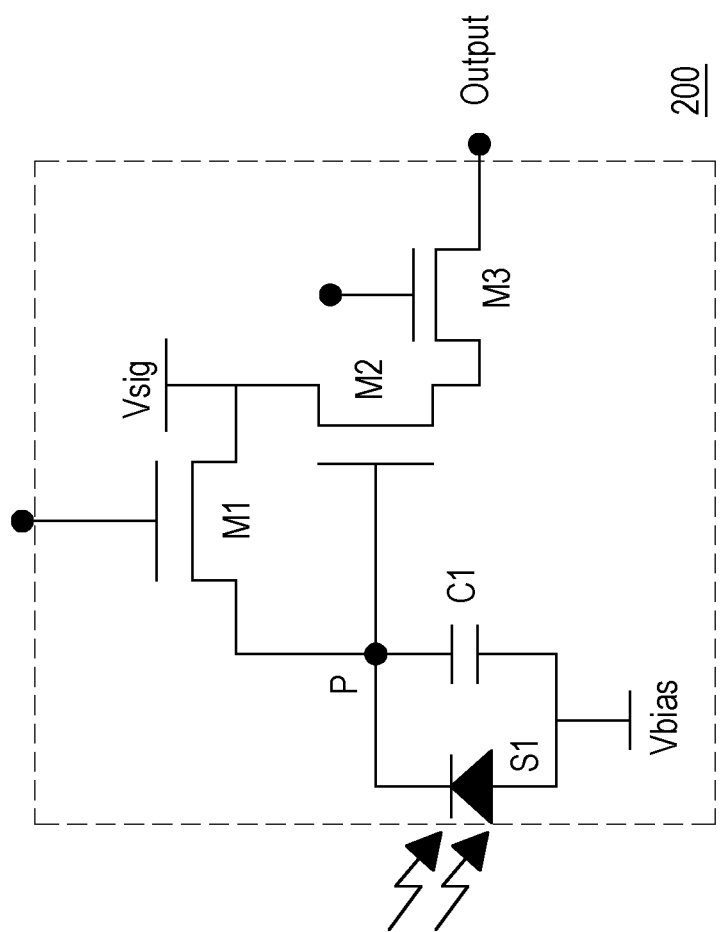
FIG. 2 is a schematic diagram of a fingerprint sensor according to one embodiment of the disclosure.

FIG. 2 is a schematic diagram of a fingerprint sensor according to one embodiment of the disclosure. Referring to FIG. 1 and FIG. 2, a fingerprint sensor 200 in FIG. 2 may be one embodiment of the fingerprint sensor 110 in FIG. 1, but the disclosure is not limited thereto. The fingerprint sensor 200 may include a photo sensor S1, a first capacitor C1, a reset switch M1, a source follower M2 (as a transistor), and a select switch M3. The photo sensor S1 may be configured to sense light in the exposure period. The photo sensor S1 may include a first terminal and a second terminal. The first capacitor C1 may include a first terminal and a second terminal. The first terminal of the photo sensor S1 and the first terminal of the first capacitor C1 may be electrically coupled to the reset node P. The second terminal of the photo sensor S1 and the second terminal of the first capacitor C1 may be electrically coupled to a bias node to receive a bias voltage Vbias. In one embodiment, the bias node may be coupled to the display common electrode. The reset switch M1 may include a first terminal, a second terminal, and a control terminal. The source follower M2 may include a first terminal, a second terminal, and a control terminal. The select switch M3 may include a first terminal, a second terminal, and a control terminal. The first terminal of the reset switch M1 and a gate (i.e. the control terminal) of the source follower M2 may be electrically coupled to the reset node P. The second terminal of the reset switch M1 and the first terminal of the source follower M2 may be electrically coupled to a power supply node to receive a voltage signal Vsig. The voltage signal Vsig may be generated by the fingerprint readout circuit 120 and outputted to the fingerprint sensing array of the touch display panel. The second terminal of source follower M2 may be electrically coupled to the first terminal of the select switch M3. The second terminal of the select switch M3 may be configured to provide a sensing voltage as an output signal at the output terminal Output. When the source follower M2 is turned on, the voltage on the first terminal of the select switch M3 follows the voltage of the reset node P.

In one embodiment, when the reset switch M1 is turned on, the reset node P is electrically coupled to the power supply node supplied with the voltage signal Vsig. The voltage signal Vsig is kept at the first voltage in the reset period. The voltage signal Vsig is kept at the initial voltage in the initialization period. In one embodiment, the first voltage may be 0V, and the initial voltage may be a work voltage VDD, but the disclosure is not limited thereto. In this manner, during the initialization period, the voltage VP of the reset node P is reset to the initial voltage, and during the reset period, the voltage VP of the reset node P is initialized to the first voltage. The voltage VP of the reset node P is reset to the first voltage after the fingerprint sensing cycle, and as a result, the touch sensing data becomes more accurate, and thereby reduces the error rate of the touch position detection.

Figure 3:
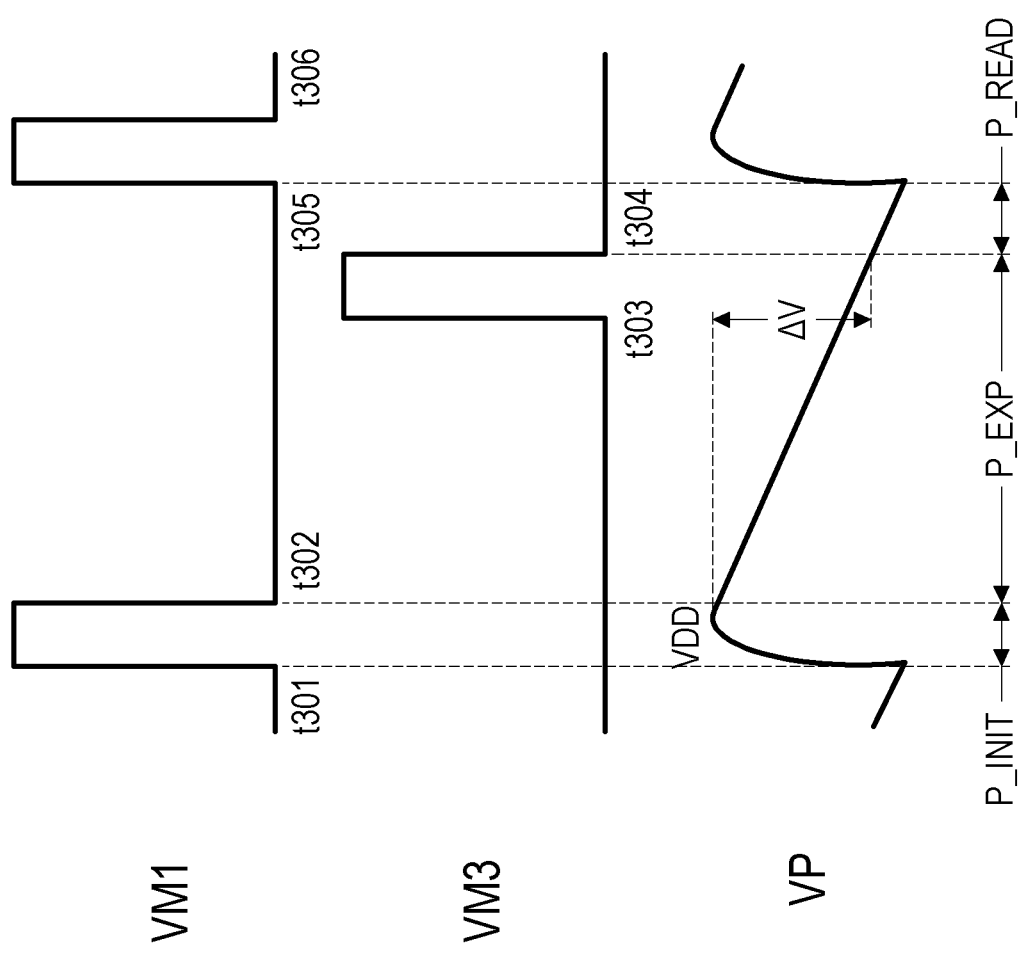
FIG. 3 is a schematic timing chart of a fingerprint sensor according to one embodiment of the disclosure.

FIG. 3 is a schematic timing chart of a fingerprint sensor according to one embodiment of the disclosure. Referring to FIG. 1 to FIG. 3, in the timing chart 300, a voltage signal to control a gate (i.e., the control terminal) of the reset switch M1 is represented by VM1. A voltage signal to control a gate (i.e., the control terminal) of select switch M3 is represented by VM3. The voltage VP of the reset node P is represented by VP. The initialization period of the fingerprint sensing cycle is represented by P_INIT. The exposure period of the fingerprint sensing cycle is represented by P_EXP. The readout period of the fingerprint sensing cycle is represented by P_READ.

In one embodiment, the fingerprint readout circuit 120 may read out a sensing voltage of each fingerprint sensor 110 via the corresponding sensing line 130 in the readout period. The sensing voltage follows the voltage VP of the reset node P. The fingerprint readout circuit 120 may generate a sensing result of each fingerprint sensor 110 based on a voltage variation between the initial voltage and the sensing voltage.

Specifically, the initialization period P_INIT of a fingerprint sensing cycle is from time t301 to time t302. The exposure period P_EXP of the fingerprint sensing cycle is from time t302 to time t304. The readout period P_READ of the fingerprint sensing cycle is from time t304 to a time before time t305. As depicted in FIG. 3, the exposure period P_EXP of the fingerprint sensing cycle is regarded from the falling edge of the voltage signal VM1 to the falling edge of the voltage signal VM3; and in another aspect, the exposure period P_EXP of the fingerprint sensing cycle may be regarded from the rising edge of the voltage signal VM1 to the rising edge of the voltage signal VM3. More precisely, regarding to each fingerprint sensor 110, the initialization operation and the readout operation depicted in FIG. 3 happens right away when the switches turned on or off. The initialization period P_INIT of another fingerprint sensing cycle is from time t305 to time t306, and the another fingerprint sensing cycle may or may not start immediately subsequent to the end of the past fingerprint sensing cycle. The readout period P_READ does not mean a period spent for reading out sensing signals from only one sensor row but means a readout operation of a sensor row in the fingerprint sensing cycle is completed before an initialization operation of the same sensor row of a next fingerprint sensing cycle. At time t301, the voltage signal VM1 is configured to be switched from a low level to a high level to turn on the reset switch M1. After the M1 is turned on, the reset node P is electrically coupled to the power supply node to receive the voltage signal Vsig, and the voltage VP is gradually increase towards the voltage signal Vsig by charging the first capacitor C1 during the initialization period P_INIT. In one embodiment, the voltage signal Vsig is kept at the initial voltage in the initialization period P_INIT and the initial voltage may be a work voltage VDD, but the disclosure is not limited thereto. At time t302, the voltage signal VM1 is configured to be switched from the high level to the low level to turn off the reset switch M1. The voltage VP is initialized to the initial voltage (work voltage VDD) and the photo sensor S1 is configured to sense light in the exposure period P_EXP. During the exposure period P_EXP, the voltage signal Vsig may be kept at the initial voltage, and the voltage VP is gradually reduced. At time t303, the voltage signal VM3 is configured to be switched from a low level to a high level to turn on the select switch M3. After the select switch M3 is turned on, a sensing voltage follows the voltage VP of the reset node P. That is to say, the voltage VP is provided to the output terminal Output as a sensing voltage. Output terminals Output of a column of fingerprint sensors 110 are coupled to a sensing line 130. The fingerprint readout circuit 120 reads out the sensing voltage of the fingerprint sensor 110 (in a column) via the sensing line 130. At time t304, the fingerprint readout circuit 120 generates a sensing result of the fingerprint sensor 110 based on a voltage variation A V between the initial voltage (work voltage VDD) and the sensing voltage. In other words, the voltage variation A V is the voltage difference between the initial voltage (which the voltage VP of the reset node P may achieve during the initialization period when M1 is turned on) and the voltage VP of the reset node P when M3 is turned off. In this manner, the fingerprint sensing apparatus 100 may realize the function of fingerprint recognition based on the sensing result. According to FIG. 3, during the fingerprint sensing cycle, the voltage signal Vsig outputted to the power supply node is kept at the initial voltage, and in another aspect, the voltage signals VM1 and VM3 always have logic state transitions under the voltage signal Vsig being kept at the initial voltage.

Figure 4:
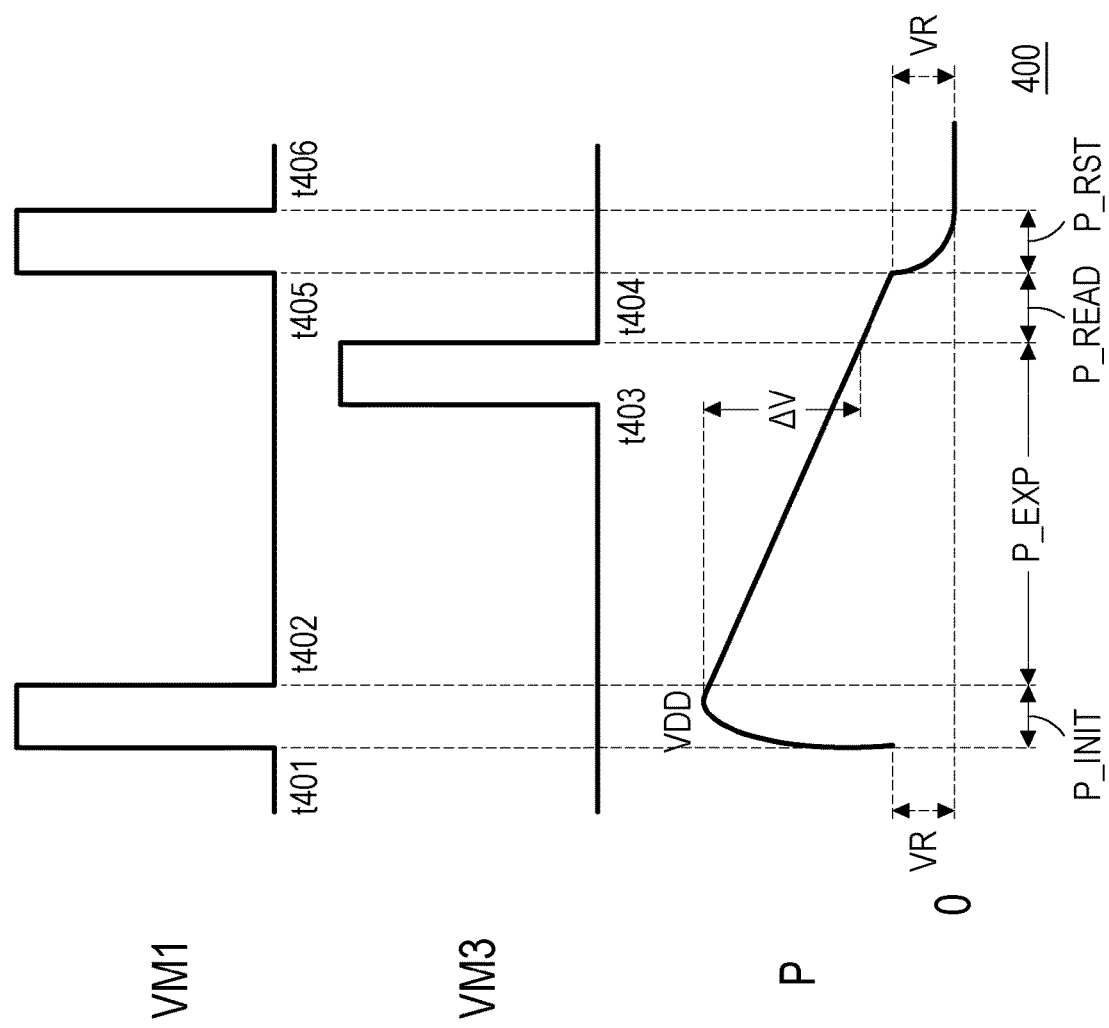
FIG. 4 is a schematic timing chart of a fingerprint sensor according to one embodiment of the disclosure.

FIG. 4 is a schematic timing chart of a fingerprint sensor according to one embodiment of the disclosure. Referring to FIG. 1 to FIG. 4, ideally, during the initialization period P_INIT, the voltage VP of the reset node P is charged from 0V to work voltage VDD since the reset switch is turned on for initialization of the fingerprint recognition. In one embodiment, after a fingerprint sensing cycle, a residual voltage VR may exist due to the residual charge in the first capacitor C1, which may influence the accuracy of touch sensing data got in touch display frame periods right after the fingerprint sensing cycle, thereby might increase the error rate of the touch position detection. In order to enhance accuracy of touch sensing data got in touch display frame periods right after the fingerprint sensing cycle and reduce the error rate of the touch position detection, a reset period P_RST may be disposed after the readout period P_READ to clear the residual charge at the reset node P.

In one embodiment, in the timing chart 400, the reset period P_RST is from time t405 to time t406 after the readout period P_READ. The initialization period P_INIT (time t401 to time t402), the exposure period P_EXP (time t402 to time t404), and the readout period P_READ (time t404 to time t405) may refer to the description of FIG. 3, and their description is not repeated herein. At time t405, the voltage signal VM1 is configured to be switched from a low level to a high level to turn on the reset switch M1. After the M1 is turned on, the reset node P is electrically coupled to the power supply node to receive the voltage signal Vsig, and the voltage VP is gradually decrease towards the voltage signal Vsig by charging the first capacitor C1 during the reset period P_RST. In one embodiment, the voltage signal Vsig is kept at a first voltage in the reset period P_RST and the first voltage may be 0V, but the disclosure is not limited thereto. At time t406, the voltage signal VM1 is configured to be switched from the high level to the low level to turn off the reset switch M1, and the voltage VP is reset to the reset voltage (0V) after the readout period P_READ. Since the voltage VP is reset to the reset voltage (0V) after the readout period P_READ, the influence resulted from the residual voltage at the reset node P to the accuracy of the touch sensing data is reduced, and as a result, the touch sensing data becomes more accurate. Therefore, the error rate of the touch position detection is reduced and the user experience is improved. Compared to FIG. 3 in which the voltage signals VM1 always have logic state transitions under the voltage signal Vsig being kept at the initial voltage (e.g., VDD), the voltage signals VM1 can have logic state transitions under the voltage signal Vsig being kept at 0V, according to the embodiment as FIG. 4 depicted.

Figure 5:
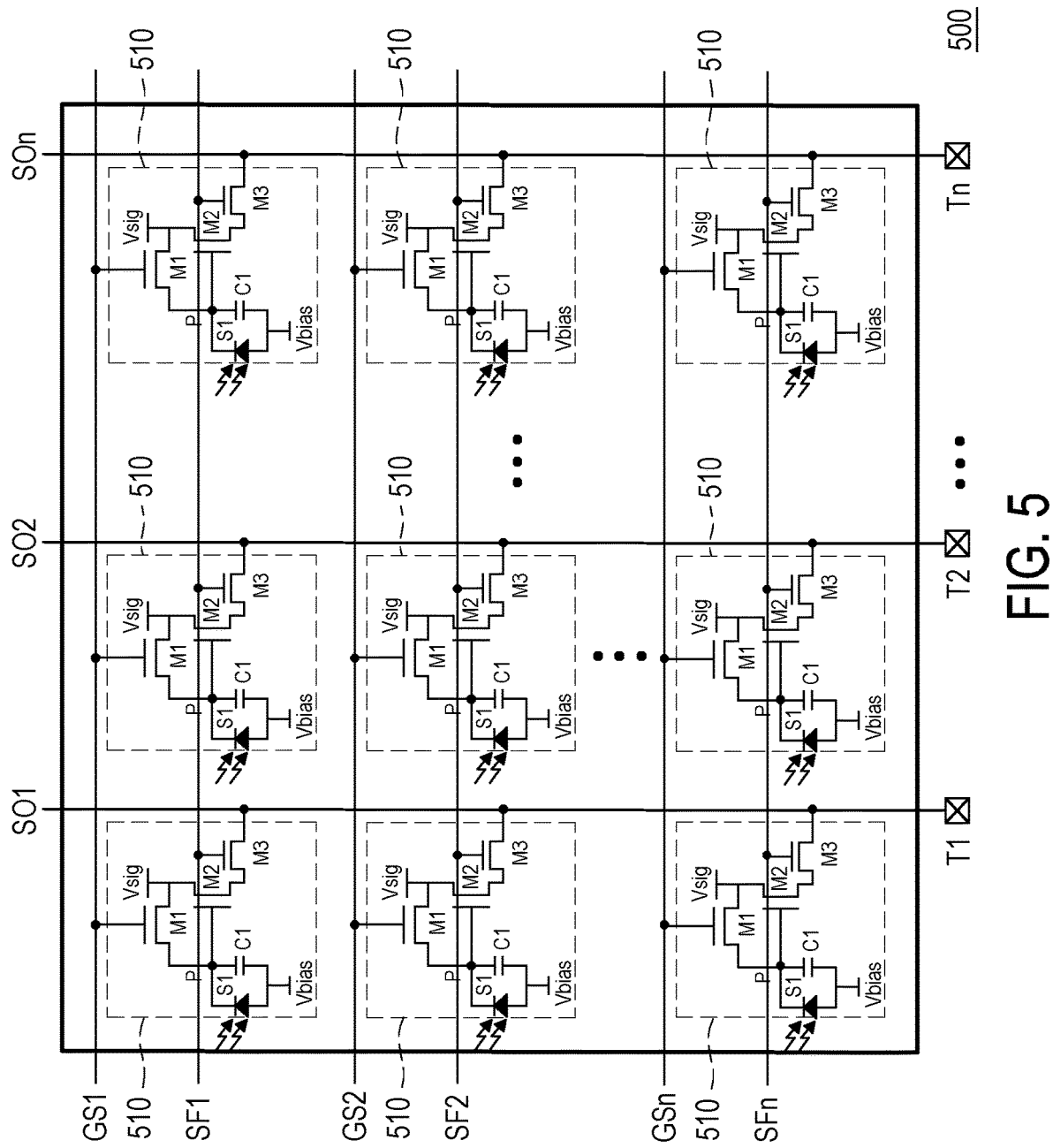
FIG. 5 is a schematic diagram of a fingerprint sensor array according to one embodiment of the disclosure.

FIG. 5 is a schematic diagram of a fingerprint sensor array according to one embodiment of the disclosure. Referring to FIG. 1 and FIG. 5, a fingerprint sensor array 500 may include a plurality of fingerprint sensors 510. The fingerprint sensors 510 may refer to the description of fingerprint sensor 110 of FIG. 1, and the description is not repeated herein. In one embodiment, the fingerprint sensors array 500 may include n rows and n column, but the disclosure is not limited thereto. The fingerprint sensors 510 may be arranged at the intersection of each row and each column. The fingerprint sensors 510 may be coupled to a plurality of sensing lines SO1~SOn, a plurality of reset lines GS1~GSn, and a plurality of fingerprint scan lines (or called select lines) SF1~SFn. The sensing lines SO1~SOn may be coupled to the fingerprint readout circuit 120. In one embodiment, the sensing lines SO1~SOn may be coupled to the fingerprint readout circuit 120 through a plurality of output terminals T1~Tn, but the disclosure is not limited thereto. The reset lines GS1~GSn may be configured to provide a voltage signal to the gate of the reset switch M1 of the fingerprint sensor 510. The fingerprint scan lines SF1~SFn may be configured to provide a voltage signal to the gate of the select switch M3 of the fingerprint sensor 510. In this manner, the fingerprint sensor array 500 may integrate the plurality of fingerprint sensors 510 to realize the fingerprint recognition.

Figure 6:
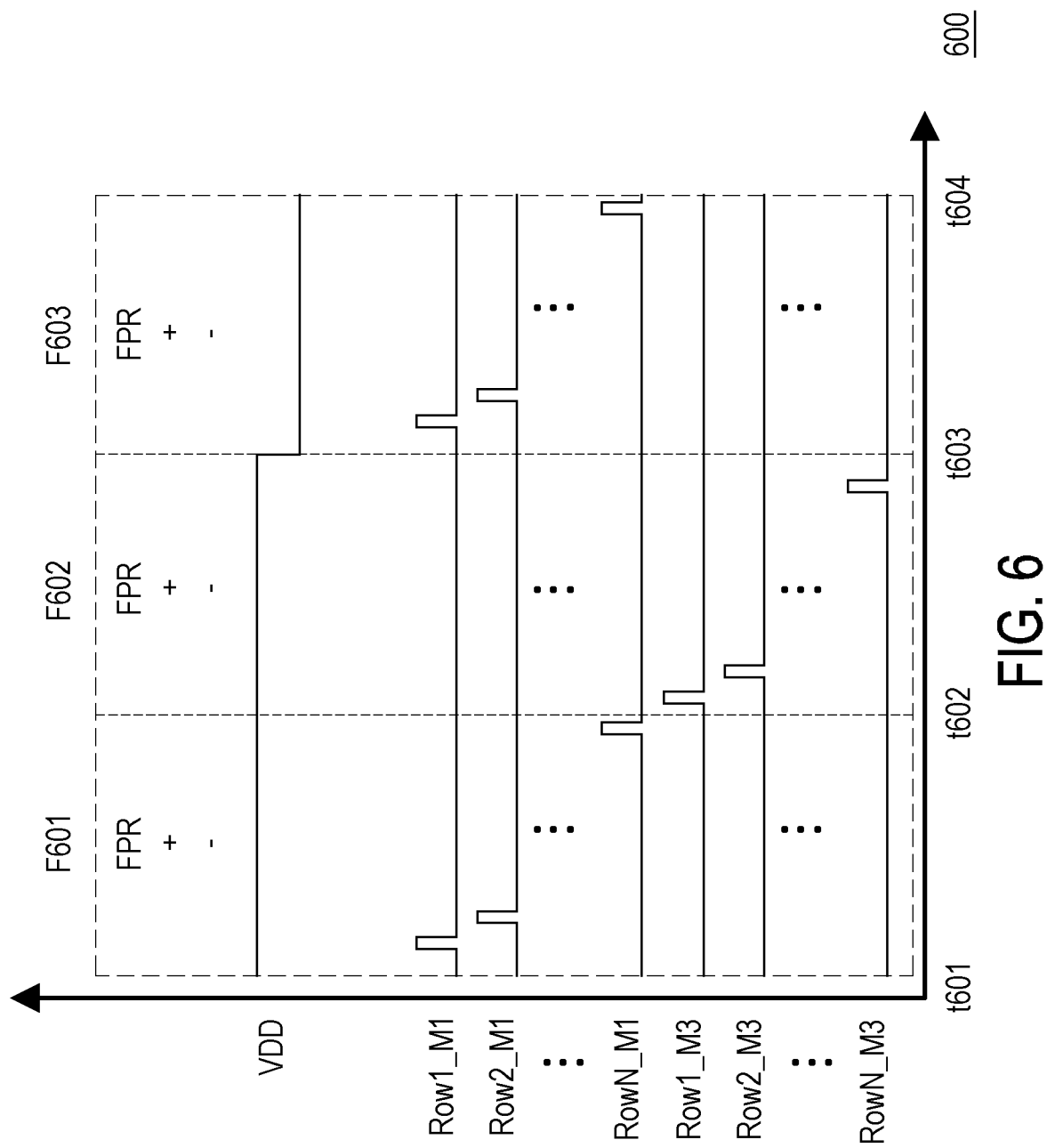
FIG. 6 is a schematic timing chart of a fingerprint sensor array according to one embodiment of the disclosure.

FIG. 6 is a schematic timing chart of a fingerprint sensor array according to one embodiment of the disclosure. Referring to FIG. 3, FIG. 5, and FIG. 6, in the timing chart 600, the work voltage VDD of the voltage signal Vsig may be represented as VDD. Row1_M1 may represent a voltage signal of the gate of the reset switch M1 of the first row in the fingerprint sensor array 500. Row2_M1 may represent a voltage signal of the gate of the reset switch M1 of the second row in the fingerprint sensor array 500. RowN_M1 may represent a voltage signal of the gate of the reset switch M1 of the Nth row in the fingerprint sensor array 500. Row1_M3 may represent a voltage signal of the gate of the select switch M3 of the first row in the fingerprint sensor array 500. Row2_M3 may represent a voltage signal of the gate of the select switch M3 of the second row in the fingerprint sensor array 500. RowN_M3 may represent a voltage signal of the gate of the select switch M3 of the Nth row in the fingerprint sensor array 500.

In this embodiment, the timing chart 600 may include a plurality of fingerprint sensing frame periods FPR. The fingerprint sensing frame periods FPR may include frame period F601, frame period F602, and frame period F603. In this embodiment, the initialization period P_INIT may be arranged in the frame period F601. In the fingerprint sensing cycle, the voltage signal Vsig may be kept at the initial voltage. The voltage signal VM1 of the gate of the reset switch M1 of each row may be switched from the low level to the high level for the initialization of the fingerprint sensors 510. Further, the voltage signal VM1 of the gate of the reset switch M1 of each row may be switched from the high level to the low level for the exposure of the fingerprint sensors 510.

In this embodiment, the readout period P_READ may be arranged in the frame period F602. The voltage signal of the gate of the select switch M3 of each row may be switched from the low level to the high level for the readout of the fingerprint sensors 510.

In this embodiment, the reset period P_RST may be arranged in the frame period F603. In the reset period P_RST, the voltage signal Vsig may be kept at the first voltage. The voltage VP of the fingerprint sensor 510 of each row may be reset row by row sequentially. In other words, the fingerprint sensors 510 may be reset row by row in the reset period P_RST.

In this manner, the reset period P_RST may be arranged in one period after the fingerprint sensing cycle to row by row reset the voltage VP of the reset node P of the fingerprint sensors 510, and as a result, the touch sensing data got in touch display frame periods right after the fingerprint sensing cycle becomes more accurate. Therefore, the error rate of the touch position detection is reduced and the user experience is improved.

Figure 7:
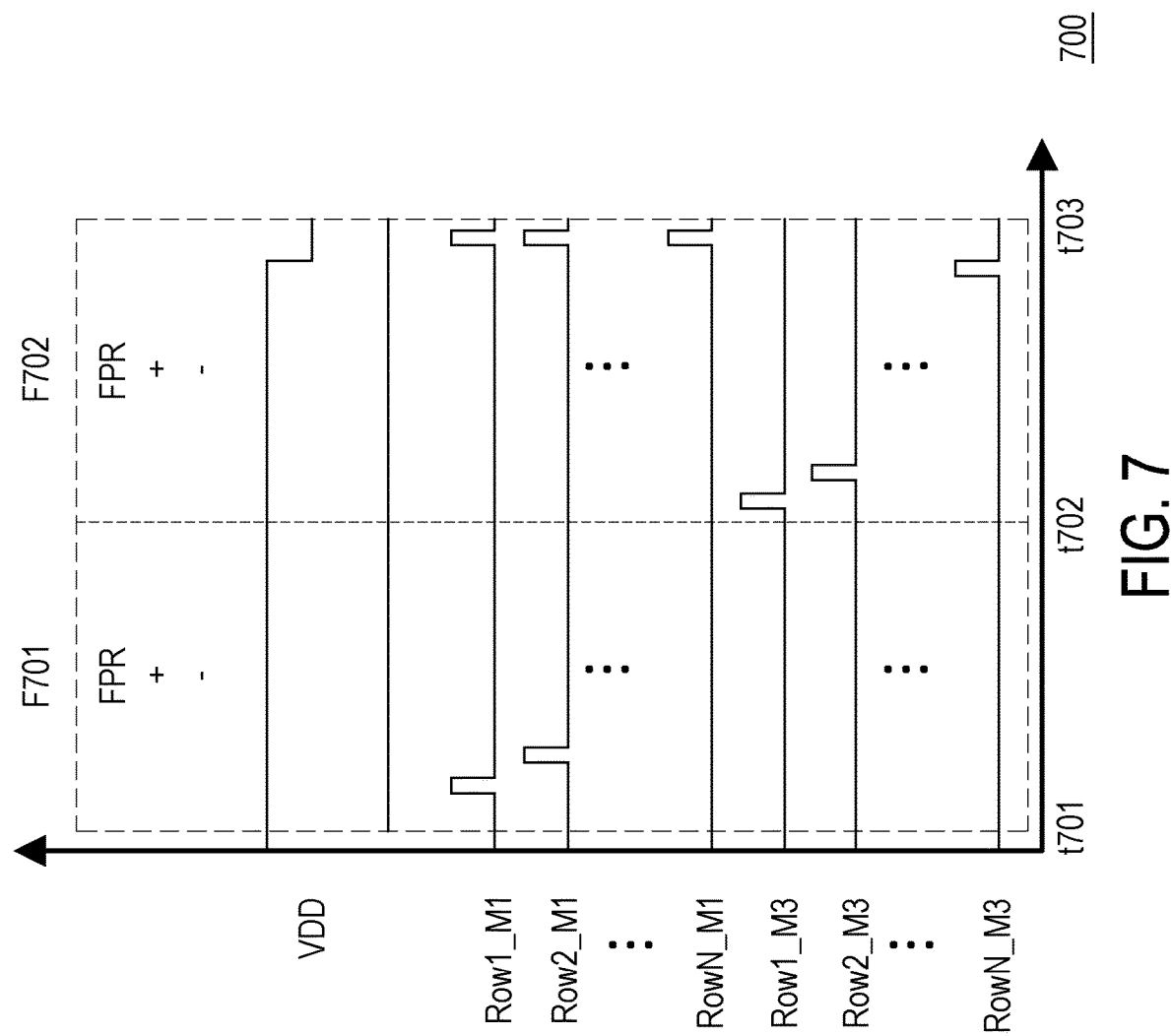
FIG. 7 is a schematic timing chart of a fingerprint sensor array according to one embodiment of the disclosure.

FIG. 7 is a schematic timing chart of a fingerprint sensor array according to one embodiment of the disclosure. Referring to FIG. 3 to FIG. 7, in the timing chart 700, instead of arranging the reset period P_RST separately in the single frame period F603, the reset period P_RST and the readout period P_READ may belong to the same frame period F702. Specifically, the reset period P_RST may be arranged at the end of the frame period F702, right after the readout period P_READ in the frame period F702. In the reset period P_RST, the voltage signal Vsig may be kept at the first voltage. The voltage VP of the fingerprint sensor 510 of each row may be reset simultaneously. In other words, the fingerprint sensors 510 may be reset simultaneously in the reset period P_RST. That is, all of the gates of the fingerprint sensors 510 may be turned on simultaneously in the reset period P_RST. The initialization period P_INIT, and the readout period P_READ may refer to the description of FIG. 6, and their description is not repeated herein.

In this manner, the reset period P_RST may be arranged in a short period after the fingerprint sensing cycle to simultaneously reset the voltage VP of the reset node P of the fingerprint sensors 510, and as a result, the touch sensing data got in touch display frame periods right after the fingerprint sensing cycle becomes more accurate. Therefore, the error rate of the touch position detection is reduced and user experience is improved.

Figure 8:
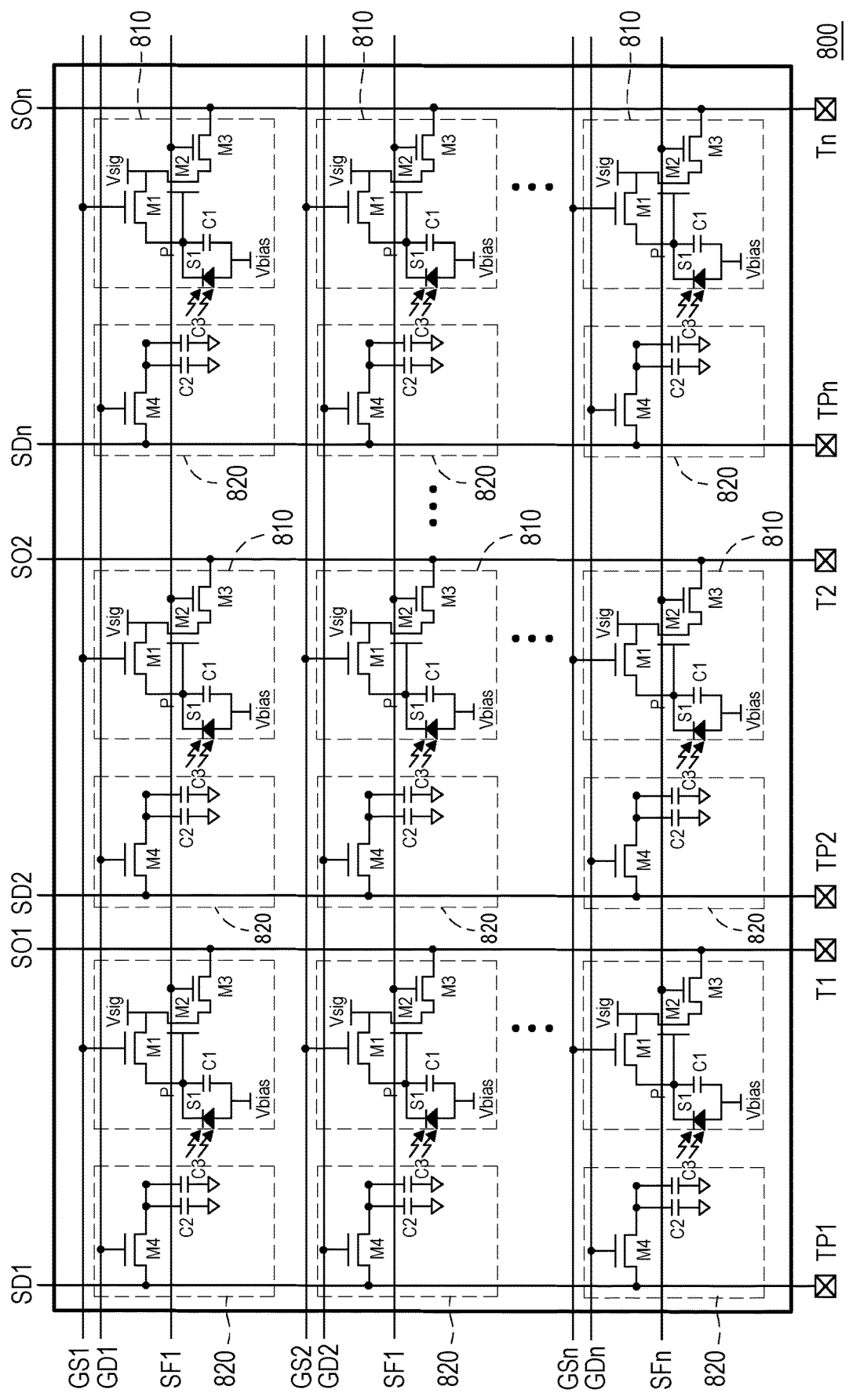
FIG. 8 is a schematic diagram of a touch display panel including a fingerprint sensor array according to one embodiment of the disclosure.

FIG. 8 is a schematic diagram of a touch display panel including a fingerprint sensor array according to one embodiment of the disclosure. Referring to FIG. 5 and FIG. 8, the touch display panel 800 may be formed by integrating the fingerprint sensor array 500 and a plurality of pixels 820. That is, the touch display panel 800 may include a plurality of fingerprint sensors 810. The fingerprint sensors 810 may refer to the description of fingerprint sensors 510 of FIG. 5, and the description is not repeated herein. The touch display panel 800 includes a plurality of electrodes (not shown in FIG. 8) used as display common electrodes (Vcom blocks) in display periods and used as touch sensing electrodes in touch sensing periods, wherein in one touch display frame period, the display periods and the touch sensing periods are time-divisional. In one embodiment, the bias node (Vbias) may be coupled to the display common electrode.

In this embodiment, each of the pixels 820 may include a pixel switch M4, a second capacitor C2, and a third capacitor C3. The pixel switch M4 may include a first terminal, a second terminal, and a control terminal. The second capacitor C2 may include a first terminal and a second terminal. The third capacitor C3 may include a first terminal and a second terminal. The second terminal of the pixel switch M4 may be electrically coupled to the first terminal of the second capacitor C2 and the first terminal of the third capacitor C3. The second capacitor C2 and the third capacitor C3 are a pixel capacitor and a storage capacitor, and the second terminal of the second capacitor C2 and the second terminal of the third capacitor C3 are coupled to a display common electrode.

The touch display panel 800 may further include a plurality of display scan lines GD1~GDn and a plurality of display data lines SD1~SDn. The display scan lines GD1~GDn may be configured to provide a gate driving voltage to a gate (i.e. the control terminal) of the pixel switch M4 of each pixel 820. The display data lines SD1~SDn may be configured to provide a data voltage to the first terminal of the pixel switch M4 of each pixel 820. In one embodiment, the display data lines SD1~SDn may be coupled to a data driving circuit through a plurality of output terminals TP1~TPn, but the disclosure is not limited thereto. In this manner, the touch display panel 800 may integrate the plurality of fingerprint sensors 810 with the plurality of pixels.

It is noted that, referring to FIG. 1, FIG. 2 and FIG. 8, the plurality of fingerprint sensors 810 arranged in an array may be located in the touch display panel 800. The touch display panel 800 may include a gate on array (GOA) circuit for fingerprint sensing control. The fingerprint readout circuit 120 may output at least one start pulse signal STV and a clock signal CLK to the gate on array circuit for fingerprint sensing control. For example, if the fingerprint sensor array is divided into four fingerprint sensing zones FZ1-FZ4 along the vertical direction (i.e. fingerprint scanning direction), the fingerprint readout circuit 120 may provide start pulse signals STV1-STV4. Further, the GOA circuit for fingerprint sensing control may include four corresponding shift register circuits, wherein each shift register circuit may generate reset signals RST correspondingly provided to the plurality of reset lines GS1~GSn connected to one of the fingerprint sensing zones FZ1-FZ4, based on one of the start pulse signals STV1-STV4 and the clock signal CLK. In other words, the gate on array circuit may outputs reset signals RST according to the at least one start pulse signal STV and the clock signal CLK. The reset signals RST may be configured to reset at least one fingerprint sensing zone of the fingerprint sensors 810 arranged in the array row by row in the reset period P_RST. For example, sensor rows of the fingerprint sensing zone FZ1 may be reset row-by-row by the reset signals RST transmitted to the fingerprint sensing zone FZ1 which are generated based on the start pulse signal STV1 and the clock signal CLK. Sensor rows of the fingerprint sensing zone FZ2 may be reset row-by-row by the reset signals RST transmitted to the fingerprint sensing zone FZ2 which are generated based on the start pulse signal STV2 and the clock signal CLK. Sensor rows of the fingerprint sensing zone FZ3 may be reset row-by-row by the reset signals RST transmitted to the fingerprint sensing zone FZ3 which are generated based on the start pulse signal STV3 and the clock signal CLK. Sensor rows of the fingerprint sensing zone FZ4 may be reset row-by-row by the reset signals RST transmitted to the fingerprint sensing zone FZ4 which are generated based on the start pulse signal STV4 and the clock signal CLK. That is, the voltage VP of the reset node P of the fingerprint sensors 810 may be reset row by row according to the start pulse signals STV1-STV4 and the clock signal CLK output from the fingerprint readout circuit 120. It is noted that, initialization signals for row-by row initializing (in the initialization period P_INIT) the sensor rows of each fingerprint sensing zones and the reset signals RST (in the reset period P_RST) are both output to the plurality of reset lines GS1~GSn.

In one embodiment, the fingerprint readout circuit 120 may output at least one start pulse signal STV, a clock signal CLK, and a control signal SIM to the gate on array circuit for fingerprint sensing control. For example, if the fingerprint sensor array is divided into four fingerprint sensing zones FZ1-FZ4 along the vertical direction (i.e. fingerprint scanning direction), the fingerprint readout circuit 120 may provide start pulse signals STV1-STV4 and the control signal SIM. Further, the GOA circuit for fingerprint sensing control may include four corresponding shift register circuits, wherein each shift register circuit may generate reset signals RST correspondingly provided to the plurality of reset lines GS1~GSn connected to one of the fingerprint sensing zones FZ1-FZ4, based on one of the start pulse signals STV1-STV4 and the clock signal CLK. Furthermore, the shift register circuit may be configured to provide the reset signals RST to one or more of the fingerprint sensing zones FZ1-FZ4, which are able to simultaneously reset all sensor rows of the one or more of the fingerprint sensing zones FZ1-FZ4, and such reset signals RST are generated according to the control signal SIM. In other words, the gate on array circuit for fingerprint sensing control may outputs reset signals RST according to the at least one start pulse signal STV, the clock signal CLK, and the control signal SIM. The reset signals RST may be configured to simultaneously reset at least one fingerprint sensing zone of the fingerprint sensors 810 arranged in the array in the reset period P_RST. For example, the reset signals RST may be simultaneously configured to reset sensor rows of the fingerprint sensing zone FZ1~FZ4 based on the start pulse signal STV1~STV4, the clock signal CLK and the control signal SIM. That is, the voltage VP of the reset node P of the fingerprint sensors 810 may be reset simultaneously according to the start pulse signal STV, the clock signal CLK, and the control signal SIM of the fingerprint readout circuit 120.

In one embodiment, the fingerprint readout circuit 120 may output at least one start pulse signal STV and a clock signal CLK to the gate on array circuit for fingerprint sensing control. For example, if the fingerprint sensor array is divided into four fingerprint sensing zones FZ1-FZ4 along the vertical direction (i.e. fingerprint scanning direction), the fingerprint readout circuit 120 may provide start pulse signals STV1-STV4. Further, the GOA circuit for fingerprint sensing control may include four corresponding shift register circuits, wherein each shift register circuit may generate selecting signals SEL correspondingly provided to the plurality of fingerprint scan lines SF1~SFn connected to one of the fingerprint sensing zones FZ1-FZ4, based on one of the start pulse signals STV1-STV4 and the clock signal CLK. In other words, the gate on array circuit for fingerprint sensing control may outputs selecting signals SEL according to the at least one start pulse signal STV and the clock signal CLK. The selecting signals SEL may be configured to row-by-row read out sensing voltages (the output of fingerprint sensor 200) of at least one fingerprint sensing zone of the fingerprint sensors 810 arranged in the array in the readout period P_READ. For example, sensing voltages of sensor rows of the fingerprint sensing zone FZ1 may be readout row-by row by the selecting signals SEL transmitted to the fingerprint sensing zone FZ1 which are generated according to the start pulse signal STV1 and the clock signal CLK. Sensing voltages of sensor rows of the fingerprint sensing zone FZ2 may be readout row-by row by the selecting signals SEL transmitted to the fingerprint sensing zone FZ2 which are generated according to the start pulse signal STV2 and the clock signal CLK. Those selecting signals SEL transmitted to the fingerprint sensing zone FZ3 or FZ4 are generated in a similar manner. That is, the sensing voltages of the sensor rows of the fingerprint sensors 810 may be read out row by row according to the start pulse signal STV and the clock signal CLK of the fingerprint readout circuit 120.

Figure 9:
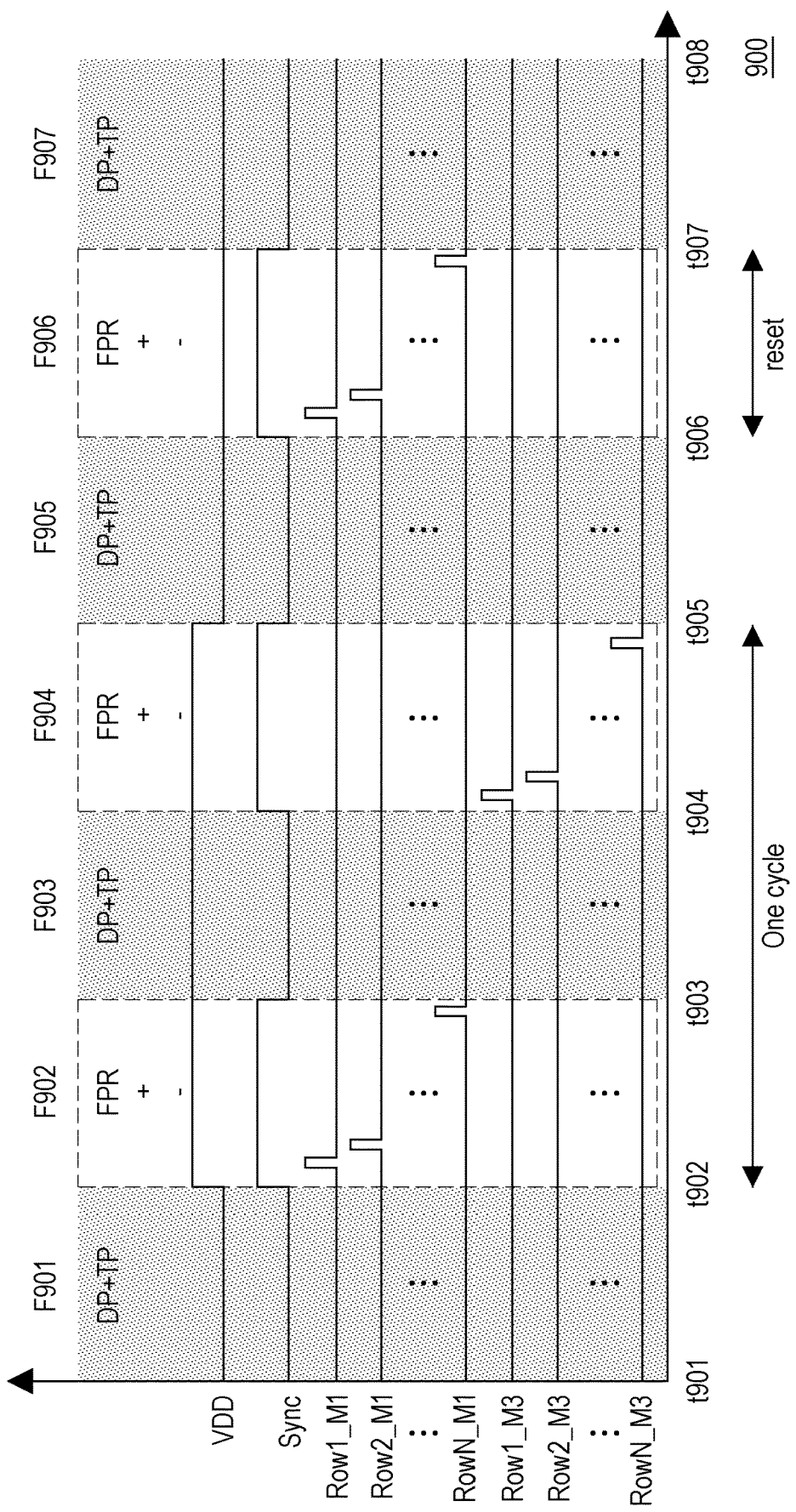
FIG. 9 is a schematic timing chart of a touch display panel including a fingerprint sensor array according to first embodiment of the disclosure.

FIG. 9 is a schematic timing chart of a touch display panel including a fingerprint sensor array according to first embodiment of the disclosure. Referring to FIG. 6 to FIG. 9, the timing chart 900 may include a plurality of frame periods F901~F907. Further, the timing chart 900 may include a plurality of fingerprint sensing frame periods denoted by FPR, and a plurality of touch display frame periods denoted by DP+TP. Furthermore, in the timing chart 900, a mode signal Sync may represent the mode of the touch display panel 800. When the mode signal Sync is at a high level, a fingerprint sensing function of the touch display panel 800 may be enabled, and a display function and a touch sensing function of the touch display panel 800 may be disabled. When the mode signal Sync is at a low level, a fingerprint sensing function of the touch display panel 800 may be disabled, and a display function and a touch sensing function of the touch display panel 800 may be enabled.

In this embodiment, a frame skip mode behaves as that one touch display frame period DP+TP is between two adjacent fingerprint sensing frame periods FPR (or in another aspect, one fingerprint sensing frame period FPR is between two adjacent touch display frame periods DP+TP). However, the number of the touch display frame periods DP+TP between two adjacent fingerprint sensing frame periods FPR is not limited thereto. As illustrated in FIG. 9, frame period F901, frame period F903, frame period F905, and F907 may be the touch display frame periods DP+TP, and frame period F902, frame period F904, and frame period F906 may be the fingerprint sensing frame periods FPR. In the fingerprint sensing frame periods FPR, the initialization period P_INIT may belong to the frame period F902, the readout period P_READ may belong to the frame period F904, and the reset period P_RST may belong to the frame period F906. That is, one frame between two consequent touch display frame periods DP+TP may be arranged for the fingerprint sensing frame period FPR. In other words, the touch display frame periods DP+TP and the fingerprint sensing frame periods FPR may be arranged alternatively in the timing chart 900. The operation mode of the touch display panel 800 with this kind of arrangement may be named as "frame skip mode".

It is noted that, one cycle of the fingerprint sensing cycle may be defined from the initialization period P_INIT to the readout period P_READ. The initialization period P_INIT of the fingerprint sensing cycle may be in a first frame period. The readout period P_READ of the fingerprint sensing cycle may be in a second frame period different from the first frame period. That is, one fingerprint sensing cycle may be defined from the frame period F902 to the frame period F904. In this embodiment, one touch display frame period DP+TP (frame period F903) is arranged between frame period F902 where the initialization period P_INIT belongs to and frame period F904 where the readout period P_READ belongs to of a same fingerprint sensing cycle. However, the number of the touch display frame periods between a fingerprint sensing frame period where the initialization period P_INIT belongs to and another fingerprint sensing frame period where the readout period P_READ belongs to of the same fingerprint sensing cycle is not limited thereto. In other words, a time length between the initialization period P_INIT and the readout period P_READ may include one or more frame periods. In the one or more frame periods between the initialization period P_INIT and the readout period P_READ, at least one of a display function and a touch sensing function is enabled and a fingerprint sensing function is disabled.

In this embodiment, the reset period P_RST may be arranged in the frame period F906. The voltage VP of the reset node P of each fingerprint sensors 810 of the touch display panel 800 may be reset row by row in the reset period P_RST. In this embodiment, before the frame period F906 which the reset period P_RST is in, there is one fingerprint sensing cycle arranged from the frame period F902 to the frame period F904, but the number of fingerprint sensing cycles arranged before the reset period P_RST is not limited thereto.

Furthermore, in this embodiment, one touch display frame period DP+TP (frame period F905) is arranged between the reset period P_RST (frame period F906) and the readout period P_READ (frame period F904). However, the number of the touch display frame periods DP+TP between a fingerprint sensing frame period where the reset period P_RST belongs to and another fingerprint sensing frame period where the readout period P_READ belongs to of a same cycle is not limited thereto and may follows the configured frame skip mode. That is, a time length between the reset period P_RST and the fingerprint sensing cycle may include one or more frame periods. In the one or more frame periods between the reset period P_RST and the fingerprint sensing cycle, at least one of a display function and a touch sensing function is enabled and a fingerprint sensing function is disabled. In addition, the fingerprint sensors 810 are reset row by row in the reset period P_RST.

Figure 10:
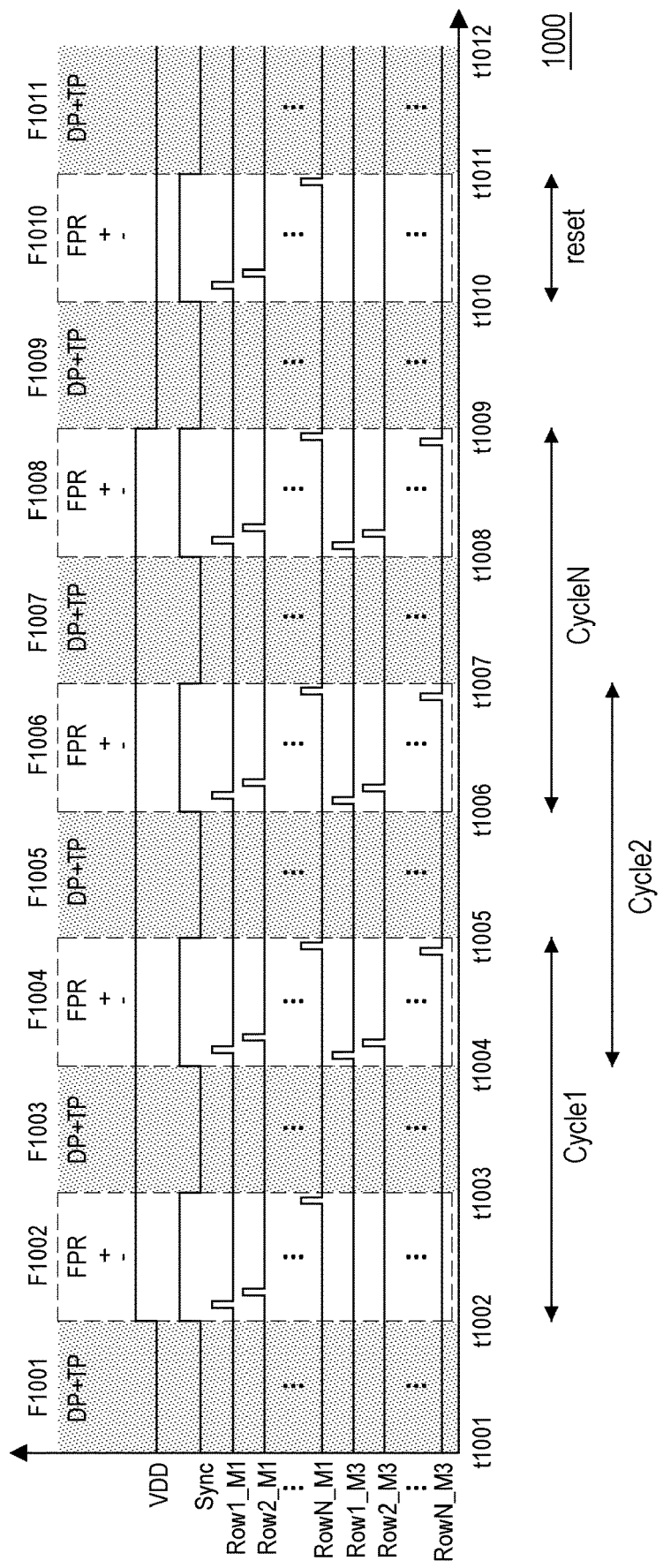
FIG. 10 is a schematic timing chart of a touch display panel including a fingerprint sensor array according to second embodiment of the disclosure.

FIG. 10 is a schematic timing chart of a touch display panel including a fingerprint sensor array according to second embodiment of the disclosure. Referring to FIG. 8 to FIG. 10, the timing chart 1000 may include a plurality of frame periods F1001~F1011.

In this embodiment, frame periods F1001, F1003, F1005, F1007, F1009, and F1011 may be the touch display frame periods DP+TP, and frame periods F1002, F1004, F1006, F1008, and F1010 may be the fingerprint sensing frame periods FPR.

In the fingerprint sensing frame period FPR, the reset period P_RST may belong to the frame period F1010. The initialization period P_INIT of a first fingerprint sensing cycle Cycle1 may belong to the frame period F1002, and the readout period P_READ of the first fingerprint sensing cycle Cycle1 may belong to the frame period F1004. The initialization period P_INIT of a second fingerprint sensing cycle Cycle2 may belong to the frame period F1004, and the readout period P_READ of the second fingerprint sensing cycle Cycle2 may belong to the frame period F1006. The initialization period P_INIT of an Nth (e.g. 3rd) fingerprint sensing cycle CycleN may belong to the frame period F1006, and the readout period P_READ of the Nth fingerprint sensing cycle CycleN may belong to the frame period F1008.

That is, one reset period P_RST may be arranged after N fingerprint sensing cycles. In other words, the voltage VP of the reset node P of each fingerprint sensors 810 of the touch display panel 800 may be reset row by row in the reset period P_RST after the N fingerprint sensing cycles, and as a result, the touch sensing data got in touch display frame periods right after the fingerprint sensing cycle becomes more accurate. Therefore, the error rate of the touch position detection is reduced and the user experience is improved.

Further, the readout period P_READ of the first fingerprint sensing cycle Cycle1 and the initialization period P_INIT of the second fingerprint sensing cycle Cycle2 may belong to the same frame period F1004. The readout period P_READ of the second fingerprint sensing cycle Cycle2 and the initialization period P_INIT of the Nth fingerprint sensing cycle CycleN may belong to the same frame period F1006. That is, the readout period P_READ of a cycle and the initialization period P_INIT of a next fingerprint sensing cycle may belong to the same frame period. Therefore, the frame periods required for N fingerprint sensing cycles may be reduced.

Figure 11:
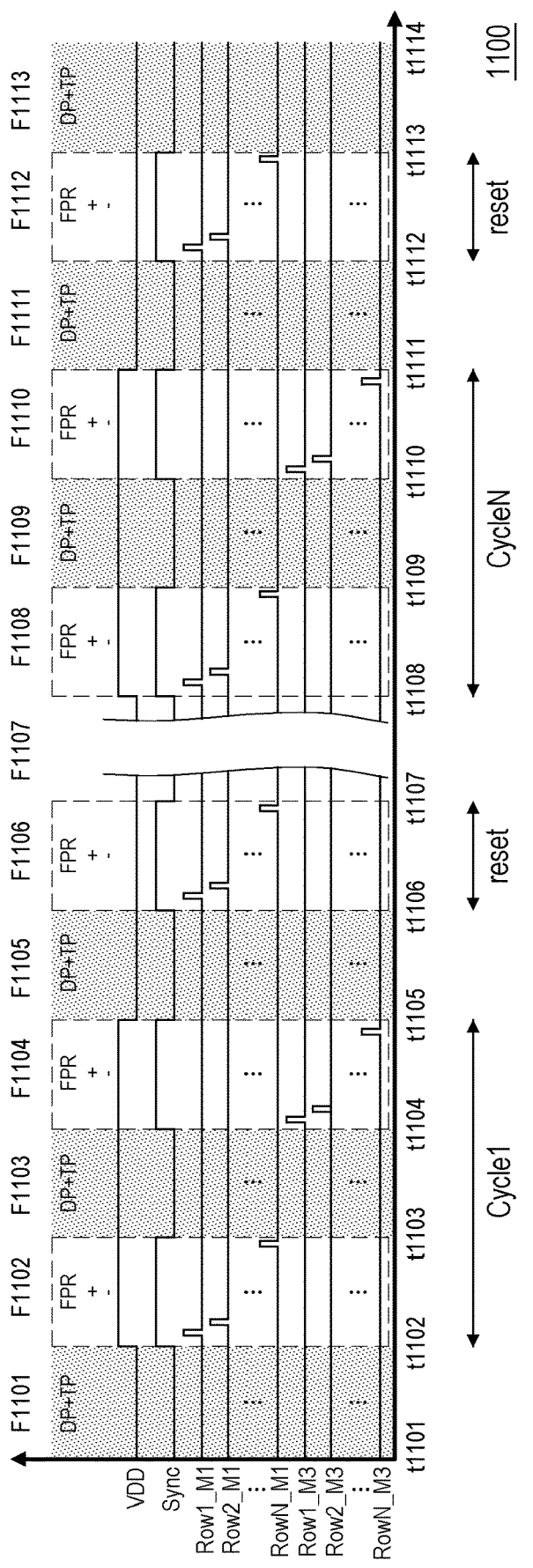
FIG. 11 is a schematic timing chart of a touch display panel including a fingerprint sensor array according to third embodiment of the disclosure.

FIG. 11 is a schematic timing chart of a touch display panel including a fingerprint sensor array according to third embodiment of the disclosure. Referring to FIG. 8 to FIG. 11, the timing chart 1100 may include a plurality of frame periods F1101~F1113.

In this embodiment, frame periods F1101, F1103, F1105, F1107, F1109, F1111, and F1113 may be the touch display frame periods DP+TP, and frame periods F1102, F1104, F1106, F1108, F1110, and F1112 may be the fingerprint sensing frame periods FPR.

In the fingerprint sensing frame periods FPR, the reset period P_RST of a first fingerprint sensing cycle Cycle1 may belong to the frame period F1106, and the reset period P_RST of a Nth fingerprint sensing cycle CycleN may belong to the frame period F1112. The initialization period P_INIT of the first fingerprint sensing cycle Cycle1 may belong to the frame period F1102, and the readout period P_READ of the first fingerprint sensing cycle Cycle1 may belong to the frame period F1104. The initialization period P_INIT of an Nth fingerprint sensing cycle CycleN may belong to the frame period F1108, and the readout period P_READ of the Nth fingerprint sensing cycle CycleN may belong to the frame period F1110.

That is, one reset period P_RST may be arranged after each fingerprint sensing cycle. In other words, the voltage VP of the reset node P of each fingerprint sensors 810 of the touch display panel 800 may be reset row by row in the reset period P_RST after each fingerprint sensing cycle, and as a result, the touch sensing data got in touch display frame periods right after the fingerprint sensing cycle becomes more accurate. Therefore, the error rate of the touch position detection is reduced and user experience is improved.

Figure 12:
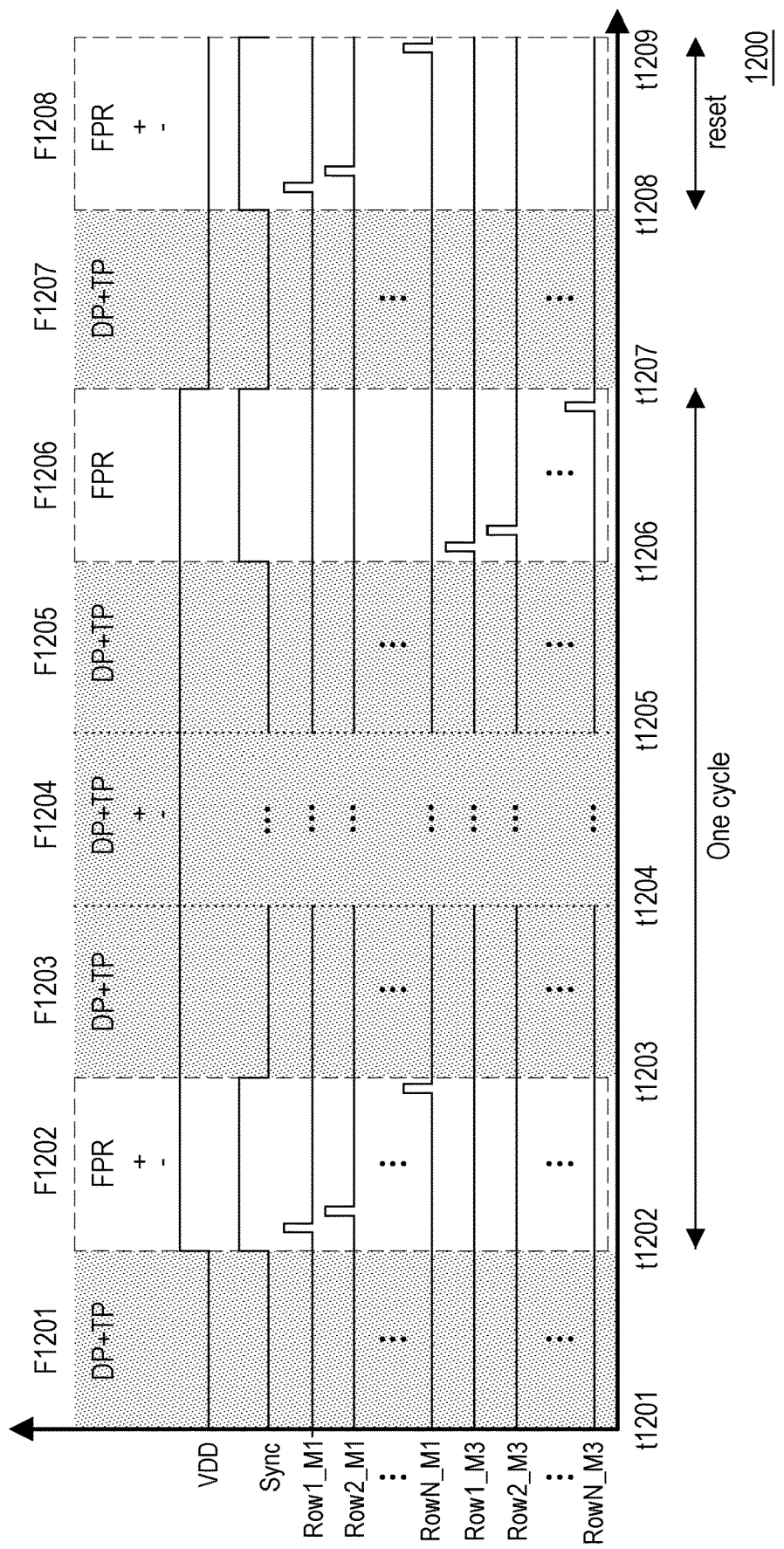
FIG. 12 is a schematic timing chart of a touch display panel including a fingerprint sensor array according to fourth embodiment of the disclosure.

FIG. 12 is a schematic timing chart of a touch display panel including a fingerprint sensor array according to fourth embodiment of the disclosure. Referring to FIG. 8 to FIG. 12, the timing chart 1200 may include a plurality of frame periods F1201~F1208.

In this embodiment, frame periods F1201, F1203, F1204, F1205, and F1207 may be the touch display frame periods DP+TP, and frame periods F1202, F1206, and F1208 may be the fingerprint sensing frame periods FPR. In the fingerprint sensing frame periods FPR, the reset period P_RST may belong to the frame period F1208, the initialization period P_INIT may belong to the frame period F1202, and the readout period P_READ may belong to the frame period F1206.

In this embodiment, a frame skip mode behaves as that three touch display frame periods DP+TP is between two adjacent fingerprint sensing frame periods FPR. However, the number of the touch display frame periods DP+TP between two adjacent fingerprint sensing frame periods FPR is not limited thereto. As illustrated in FIG. 12, three touch display frame periods DP+TP (frame periods F1203~F1205) may be arranged between two consequent fingerprint sensing frame periods FPR (frame periods F1202 and F1206). In other words, a time length between the initialization period P_INIT and the readout period P_READ may include one or more frame periods. In the one or more frame periods between the initialization period P_INIT and the readout period P_READ, at least one of a display function and a touch sensing function is enabled and a fingerprint sensing function is disabled.

In this embodiment, before the frame period F1208 which the reset period P_RST is in, one touch display frame period DP+TP (frame period F1207) is arranged between the reset period P_RST (frame period F1208) and the readout period P_READ (frame period F1206), but the number of touch display frame periods DP+TP arranged between the reset period P_RST and the readout period P_READ is not limited thereto. In one embodiment, the number of the touch display frame periods DP+TP arranged between the reset period P_RST and the readout period P_READ may be same as the number of the touch display frame periods DP+TP between the initialization period P_INIT and the readout period P_READ, but the disclosure is not limited thereto. For example, three touch display frame periods DP+TP may be arranged between the initialization period P_INIT and the readout period P_READ, and three touch display frame periods DP+TP may be arranged between the readout period P_READ and the reset period P_RST.

Figure 13:
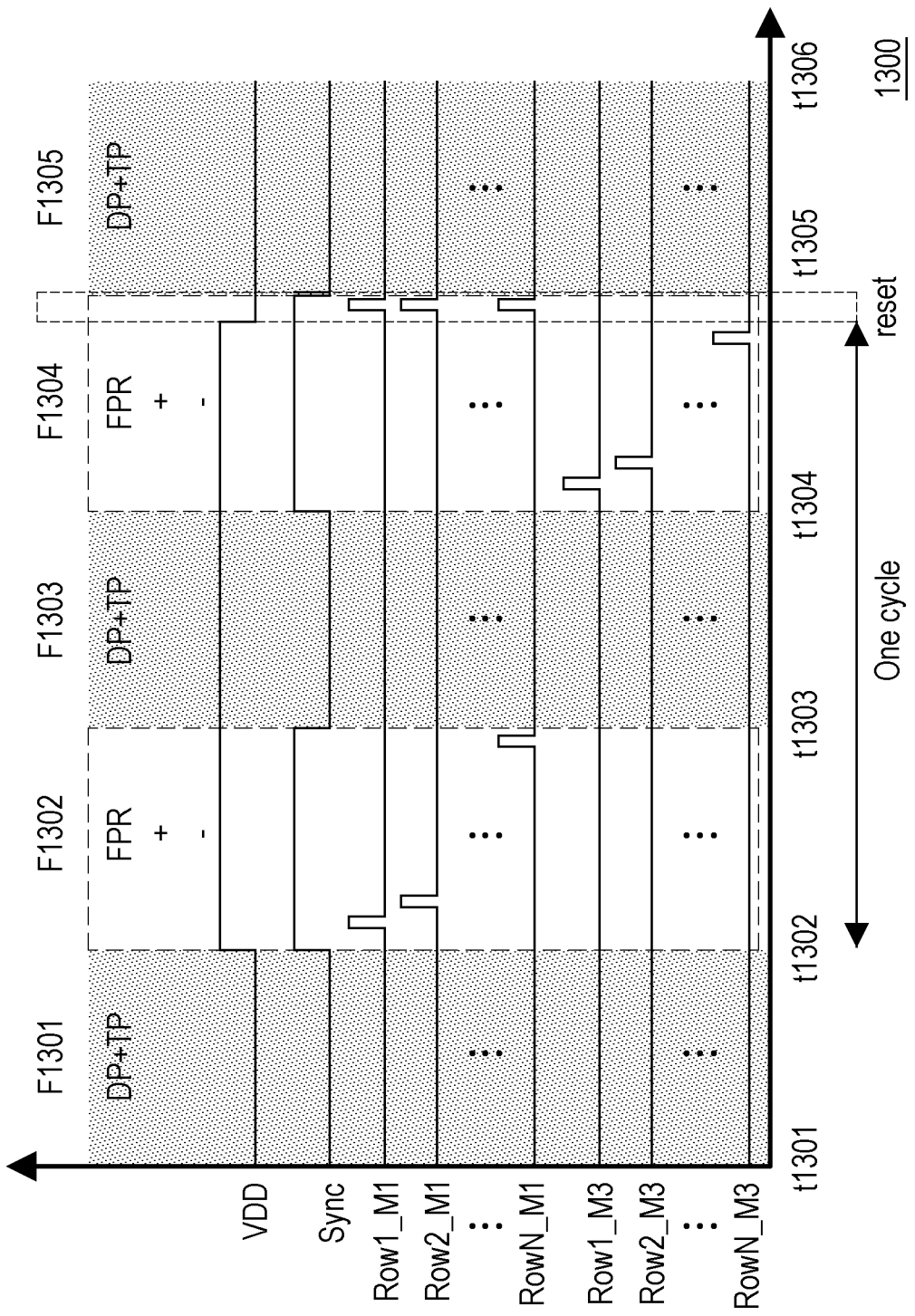
FIG. 13 is a schematic timing chart of a touch display panel including a fingerprint sensor array according to fifth embodiment of the disclosure.

FIG. 13 is a schematic timing chart of a touch display panel including a fingerprint sensor array according to fifth embodiment of the disclosure. Referring to FIG. 8 to FIG. 13, the timing chart 1300 may include a plurality of frame periods F1301~F1305.

In this embodiment, a frame skip mode behaves as that one touch display frame periods DP+TP is between two adjacent fingerprint sensing frame periods FPR. However, the number of the touch display frame periods DP+TP between two adjacent fingerprint sensing frame periods FPR is not limited thereto. As illustrated in FIG. 13, frame periods F1301, F1303, and F1305 may be the touch display frame periods DP+TP, and frame periods F1302, and F1304 may be the fingerprint sensing frame periods FPR. In the fingerprint sensing frame periods FPR, the reset period P_RST and the readout period P_READ of the fingerprint sensing cycle may belong to the same frame periods F1304. Specifically, the reset period P_RST may be arranged at the end of the frame period F1304, right after the readout period P_READ in the frame period F1304. Further, instead of resetting the fingerprint sensors 810 row by row, the fingerprint sensors 810 may be reset simultaneously. Therefore, the time for resetting all the fingerprint sensors 810 of the touch display panel 800 may be reduced.

In this embodiment, a frame skip mode behaves as that one touch display frame period DP+TP is between two adjacent fingerprint sensing frame periods FPR (or in another aspect, one fingerprint sensing frame period FPR is between two adjacent touch display frame periods DP+TP. However, the number of the touch display frame periods DP+TP between two adjacent fingerprint sensing frame periods FPR is not limited thereto. As illustrated in FIG. 13, one touch display frame period DP+TP (frame period F1303) is arranged between the fingerprint sensing frame period F1302 where the initialization period P_INIT belongs to and the fingerprint sensing frame period F1304 where the readout period P_READ belongs to.

Figure 14:
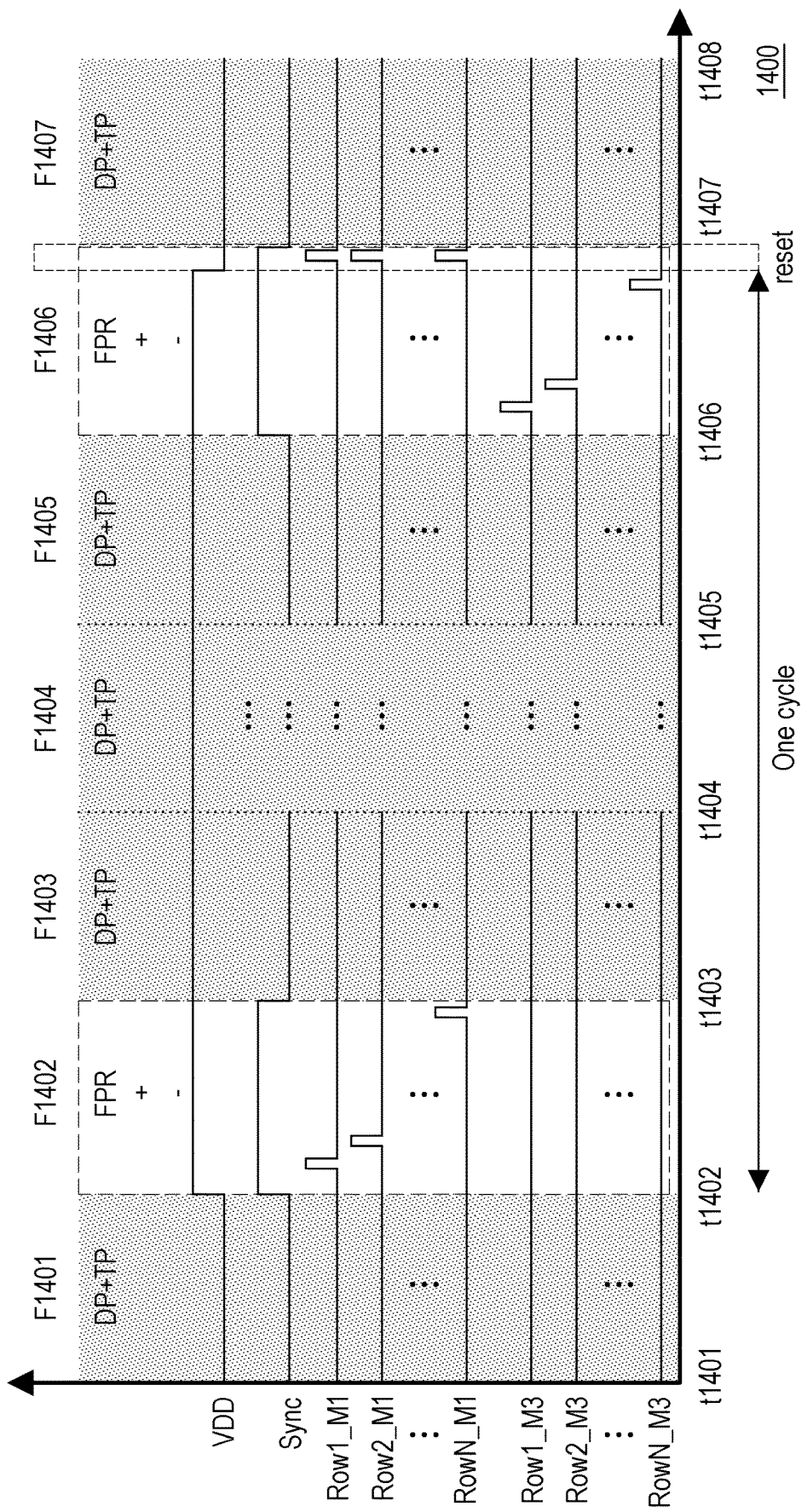
FIG. 14 is a schematic timing chart of a touch display panel including a fingerprint sensor array according to sixth embodiment of the disclosure.

FIG. 14 is a schematic timing chart of a touch display panel including a fingerprint sensor array according to sixth embodiment of the disclosure. Referring to FIG. 8 to FIG. 14, the timing chart 1400 may include a plurality of frame periods F1401~F1407.

In this embodiment, a frame skip mode behaves as that three touch display frame periods DP+TP is between two adjacent fingerprint sensing frame periods FPR. However, the number of the touch display frame periods DP+TP between two adjacent fingerprint sensing frame periods FPR is not limited thereto. Frame periods F1401, F1403, F1404, F1405, and F1407 may be the touch display frame periods DP+TP, and frame periods F1402, and F1406 may be the fingerprint sensing frame periods FPR. In the fingerprint sensing frame periods FPR, the reset period P_RST and the readout period P_READ of the fingerprint sensing cycle may belong to the same frame period F1406. Specifically, the reset period P_RST may be arranged at the end of the frame period F1406, right after the readout period P_READ in the frame period F1406. Further, instead of resetting the fingerprint sensors 810 row by row, the fingerprint sensors 810 may be reset simultaneously. Therefore, the time for resetting all the fingerprint sensors 810 of the touch display panel 800 may be reduced.

In this embodiment, if there is at least one more fingerprint sensing cycle except the first fingerprint sensing cycle which is from the frame periods F1402 to F1406, the second fingerprint sensing cycle may start in a fingerprint sensing frame period coming after the fingerprint sensing frame period F1402, such as the frame period F1406 or the frame period F1410 (not shown), based on the frame skip mode which behaves as that three touch display frame periods DP+TP is between two adjacent fingerprint sensing frame periods FPR, but the disclosure is not limited thereto.

Figure 15:
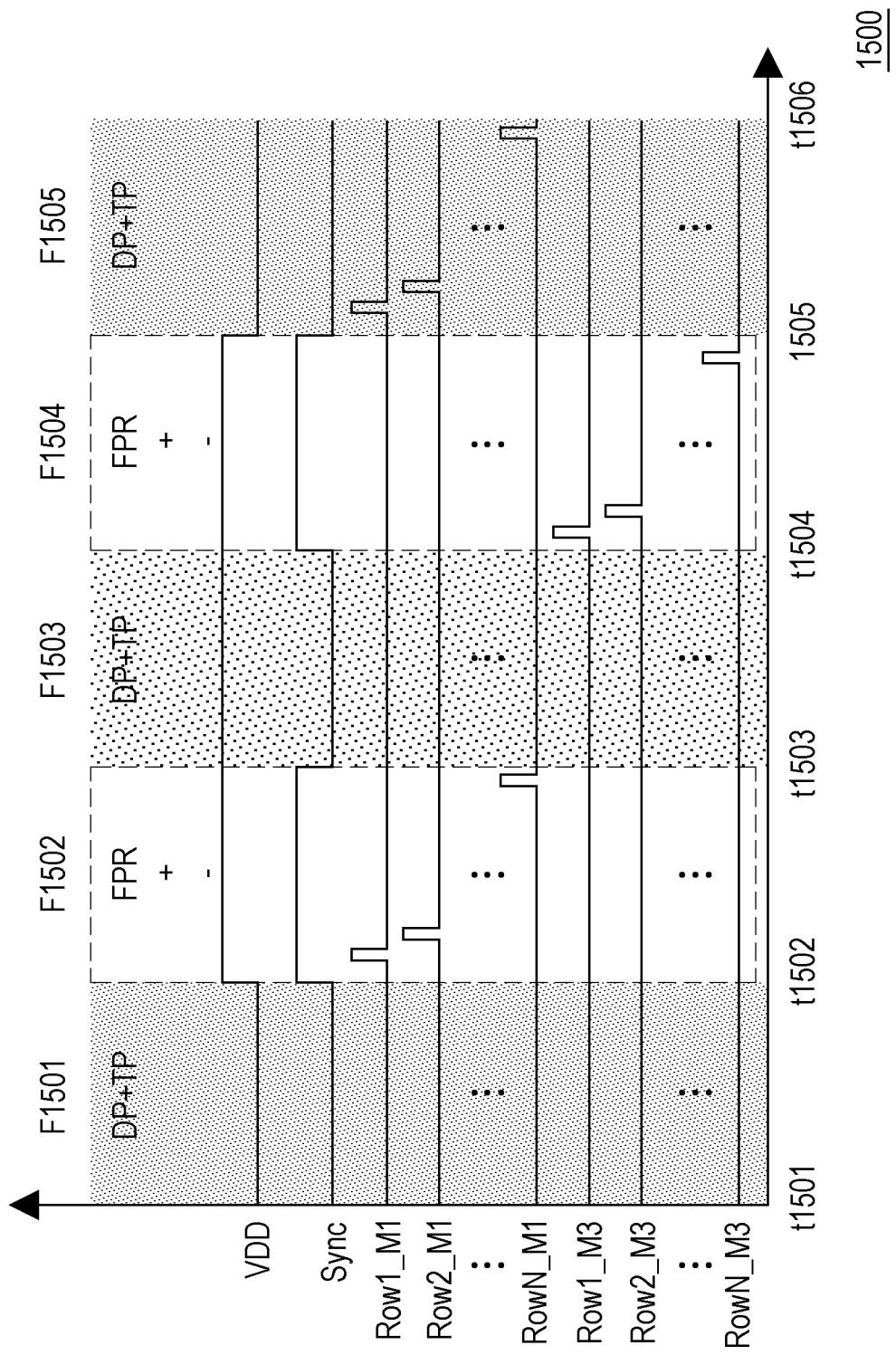
FIG. 15 is a schematic timing chart of a touch display panel including a fingerprint sensor array according to seventh embodiment of the disclosure.

FIG. 15 is a schematic timing chart of a touch display panel including a fingerprint sensor array according to seventh embodiment of the disclosure. Referring to FIG. 8 to FIG. 15, the timing chart 1500 may include a plurality of frame periods F1501~F1505.

In this embodiment, a frame skip mode behaves as that three touch display frame periods DP+TP is between two adjacent fingerprint sensing frame periods FPR. Frame periods F1501, F1503, and F1505 may be the touch display frame periods DP+TP, and frame periods F1502, and F1504 may be the fingerprint sensing frame periods FPR. In the fingerprint sensing frame periods FPR, the initialization period P_INIT may belong to the frame period F1502, and the readout period P_READ may belong to the frame period F1504.

It is noted that the reset period P_RST after the readout period P_READ may be arranged in the touch display frame period DP+TP (frame period F1505) after the fingerprint sensing frame period FPR (frame period F1504) where the readout period P_READ belongs to. Further, the plurality of fingerprint sensor 810 in the frame period F1505 may be reset row by row. That is, the plurality of fingerprint sensors 810 are reset row by row in a frame period that at least one of a display function and a touch sensing function is enabled and a fingerprint sensing function is disabled after a fingerprint sensing cycle. Therefore, the time for resetting all the fingerprint sensors 810 of the touch display panel 800 may be reduced.

Figure 16:
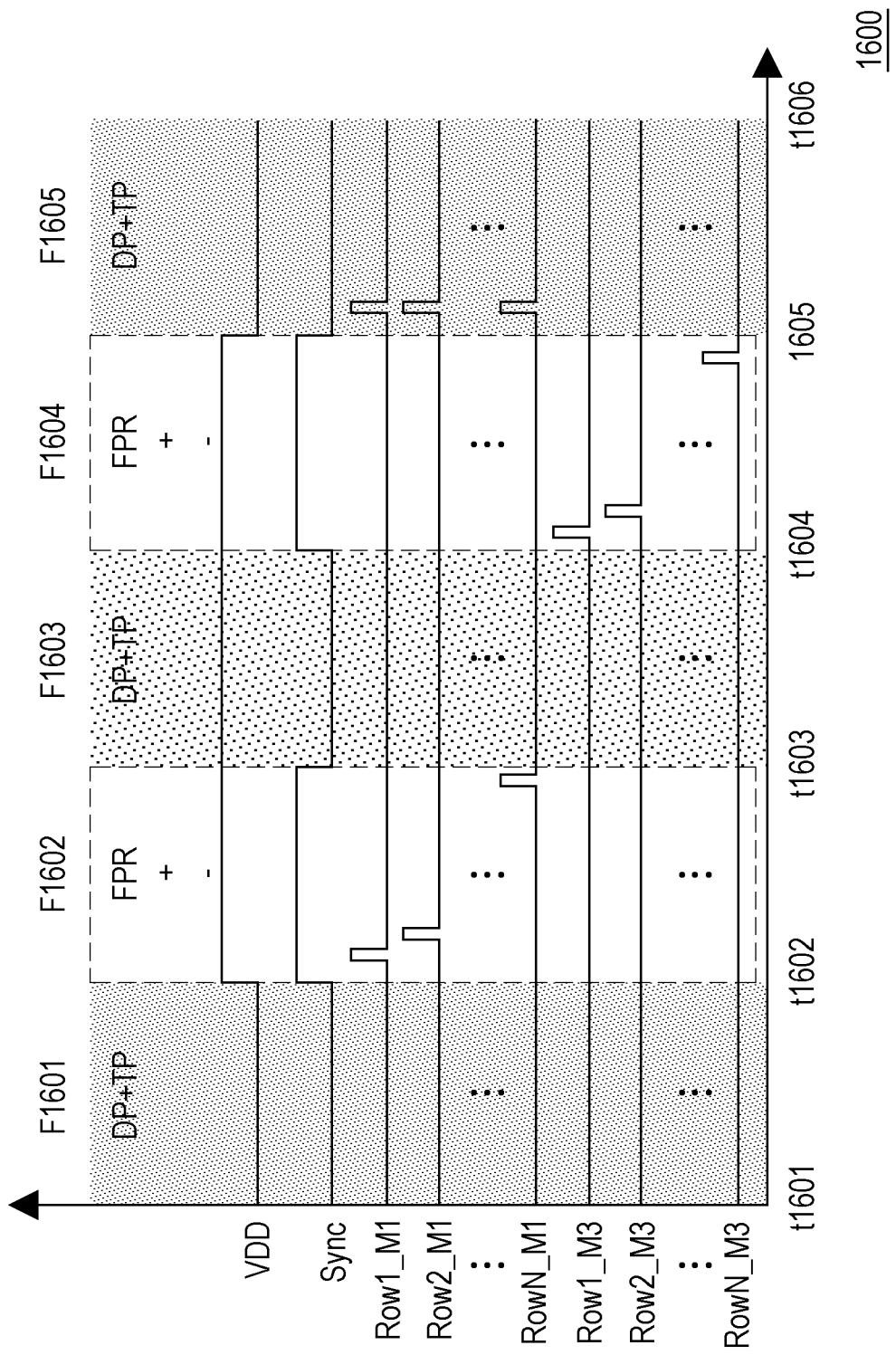
FIG. 16 is a schematic timing chart of a touch display panel including a fingerprint sensor array according to eighth embodiment of the disclosure.

FIG. 16 is a schematic timing chart of a touch display panel including a fingerprint sensor array according to eighth embodiment of the disclosure. Referring to FIG. 8 to FIG. 16, the timing chart 1600 may include a plurality of frame periods F1601~F1605.

In this embodiment, a frame skip mode behaves as that three touch display frame periods DP+TP is between two adjacent fingerprint sensing frame periods FPR. Frame periods F1601, F1603, and F1605 may be the touch display frame periods DP+TP, and frame periods F1602, and F1604 may be the fingerprint sensing frame periods FPR. The initialization period P_INIT may belong to the frame period F1602, and the readout period P_READ may belong to the frame period F1604.

It is noted that the reset period P_RST after the readout period P_READ may be arranged in the touch display frame period DP+TP (frame period F1605) after the fingerprint sensing frame period FPR (frame period F1604) where the readout period P_READ belongs to. Further, the plurality of fingerprint sensor 810 in the frame period F1505 may be reset simultaneously. That is, the plurality of fingerprint sensors 810 are reset simultaneously in a frame period that at least one of a display function and a touch sensing function is enabled and a fingerprint sensing function is disabled after a fingerprint sensing cycle. Therefore, the time for resetting all the fingerprint sensors 810 of the touch display panel 800 may be reduced.

Besides, different from the aforementioned frame skip mode, "porch mode" is also an operation mode for fingerprint sensing of the touch display panel 800. A frame period consists of an active display period (in which all horizontal display lines sequentially displayed) and a porch interval there is no display data. Porch interval is also a vertical blanking interval. In the porch mode, fingerprint sensing operations such as initialization, readout and resetting after the fingerprint sensing cycle are performed in porch intervals. It is noted that, a porch interval may be defined as a time length between the end of outputting a display frame of the touch display panel 800 and the beginning of outputting a next display frame of the touch display panel 800. That is, the entire porch interval may be between two adjacent frame periods. A part of the porch interval is located in a current frame period and the other part of the porch interval is located in a next frame period. The length of a porch interval may be predetermined based on a display refresh rate of the touch display panel 800. When the display refresh rate is variable, which is called variable refresh rate (VRR), the length of the porch interval may be also variable.

In one embodiment, the reset period P_RST and the fingerprint sensing cycle may be performed in a porch interval. The porch interval may be located in two adjacent frame periods. That is to say, the reset period P_RST and the fingerprint sensing cycle may be arranged in the porch interval between two consequent touch display frame period DP+TP.

In the porch interval, the plurality of fingerprint sensors 810 may reset row by row in the reset period P_RST. In another embodiment, all of rows of the plurality of fingerprint sensors 810 may be reset simultaneously in the reset period P_RST, and the disclosure is not limited thereto.

In one embodiment, the fingerprint sensing cycle may be completely performed by a plurality of first porch intervals. The reset period P_RST may be in a second porch interval coming after the plurality of first porch intervals. Further, any of the plurality of first porch intervals and the second porch interval may be located in two adjacent frame periods. The initialization period P_INIT, the exposure period P_EXP, and the readout period P_READ of the same fingerprint sensing cycle may be arranged in different porch intervals. In another embodiment, the fingerprint sensing cycle and the reset period P_RST after the fingerprint sensing cycle may be completely performed in a long porch interval under variable refresh rate (VRR).

Figure 17:
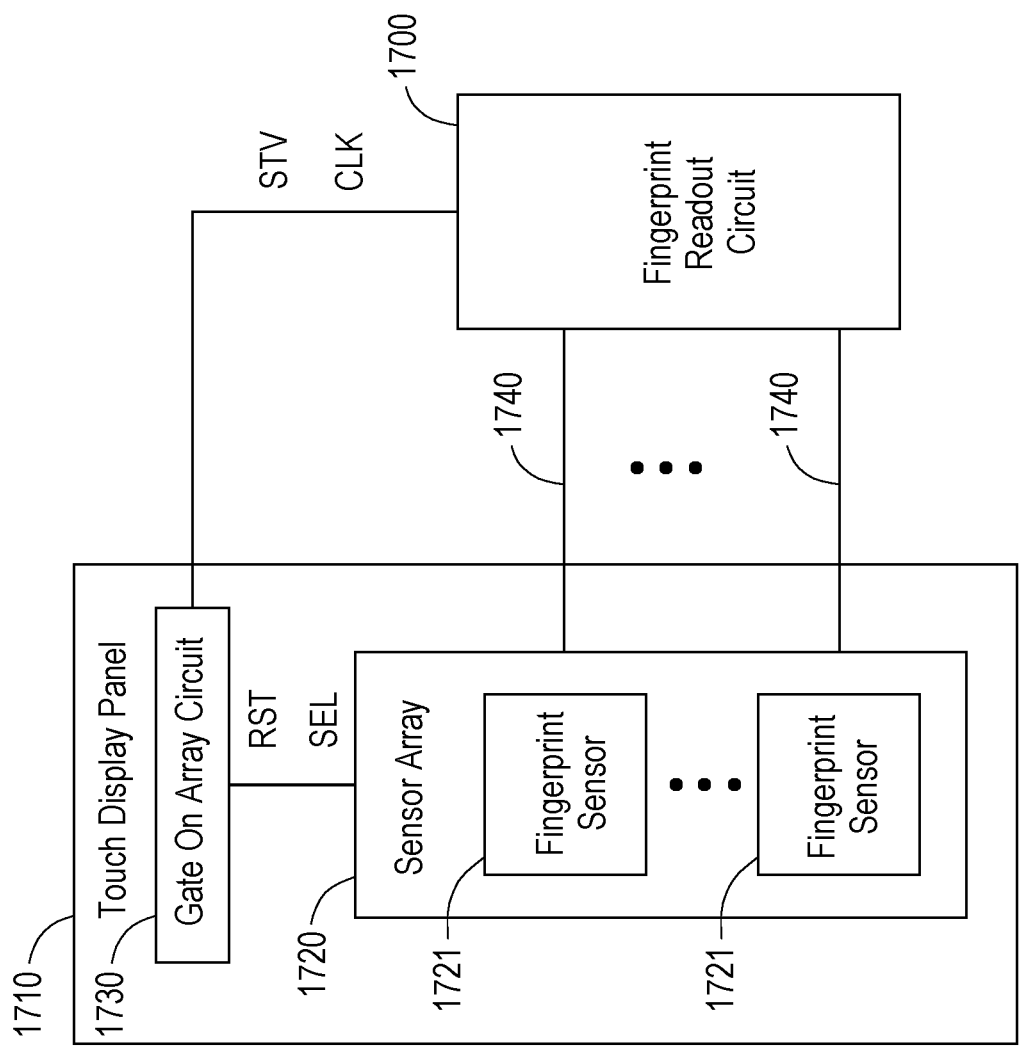
FIG. 17 is a schematic diagram of a fingerprint readout circuit according to one embodiment of the disclosure.

FIG. 17 is a schematic diagram of a fingerprint readout circuit according to one embodiment of the disclosure. Referring to FIG. 2, FIG. 8 and FIG. 17, a fingerprint readout circuit 1700 is configurable to be coupled to a touch display panel 1710. The touch display panel may include a plurality of fingerprint sensors 1721 arranged in a sensor array 1720 and a gate on array circuit 1730 for fingerprint sensing control. The fingerprint readout circuit 1700 may be coupled to the plurality of fingerprint sensors 1721 via a plurality of sensing lines 1740. The fingerprint readout circuit 1700 may be coupled to the gate on array circuit 1730. The fingerprint readout circuit 1700 may be configured to output at least one start pulse signal STV and at least one clock signal CLK to control the gate on array circuit 1730 to output reset signals RST and selecting signals SEL. The reset signals RST and the selecting signals SEL may be configured to control at least one fingerprint sensing zone of the fingerprint sensors 1721 arranged in the sensor array 1720 to operate in a fingerprint sensing cycle. The fingerprint sensing cycle may include an initialization period P_INIT, an exposure period P_EXP, and a readout period P_READ. According to the reset signals RST, a voltage VP of a reset node P in each fingerprint sensor 1721 among the fingerprint sensors 1721 may be reset to a first voltage in a reset period P_RST after the fingerprint sensing cycle ends. The voltage VP of the reset node P in each fingerprint sensor 1721 may be initialized to an initial voltage in the initialization period P_INIT. The initial voltage is different from the first voltage.

In one embodiment, the fingerprint readout circuit 1700 may be configured to output a voltage signal Vsig to the touch display panel 1710. The voltage signal Vsig may be kept at the first voltage in the reset period P_RST. The voltage signal Vsig may be kept at the initial voltage in the initialization period P_INIT. The first voltage is different from the initial voltage. For example, the first voltage is 0V and the initial voltage is a work voltage VDD such as 4V.

In one embodiment, the reset node P may be electrically coupled to a power supply node supplied with the voltage signal Vsig.

In one embodiment, the fingerprint readout circuit 1700 may output at least one start pulse signal STV and a clock signal CLK to the gate on array circuit 1730. The gate on array circuit 1730 may output reset signals RST according to the at least one start pulse signal STV and the clock signal CLK. The reset signals RST may be configured to reset at least one fingerprint sensing zone of the fingerprint sensors 1721 arranged in the sensor array 1720 row by row in the reset period P_RST.

In one embodiment, the fingerprint readout circuit 1700 may output at least one start pulse signal STV, a clock signal CLK and a control signal SIM to the gate on array circuit 1730. For example, if the fingerprint sensor array is divided into four fingerprint sensing zones FZ1-FZ4 along the vertical direction (i.e. fingerprint scanning direction), the fingerprint readout circuit 120 may provide start pulse signals STV1-STV4 and the control signal SIM. Further, the gate on array circuit 1730 may include four corresponding shift register circuits, wherein each shift register circuit may generate reset signals RST correspondingly provided to the plurality of reset lines GS1~GSn connected to the fingerprint sensing zones FZ1-FZ4, based on one of the start pulse signals STV1-STV4 and the clock signal CLK. Furthermore, the shift register circuit may be configured to provide the reset signals RST to the fingerprint sensing zones FZ1-FZ4 simultaneously according to the control signal SIM. In other words, the gate on array circuit 1730 may output reset signals RST according to the at least one start pulse signal STV, the clock signal CLK and the control signal SIM. The reset signals RST may be configured to simultaneously reset at least one fingerprint sensing zone of the fingerprint sensors 1721 arranged in the sensor array 1720 in the reset period P_RST.

In one embodiment, the fingerprint readout circuit 1700 may output at least one start pulse signal STV and a clock signal CLK to the gate on array circuit 1730. The gate on array circuit 1730 may output selecting signals SEL according to the at least one start pulse signal STV and the clock signal CLK. The selecting signals SEL may be configured to row-by-row read out sensing voltages of at least one fingerprint sensing zone of the fingerprint sensors 1721 arranged in the sensor array 1720 in the readout period P_READ.

In this manner, the reset period P_RST may be arranged after the fingerprint sensing cycle to reset the voltage VP of the reset node P of the fingerprint sensors 1721, and as a result, the touch sensing data got in touch display frame periods right after the fingerprint sensing cycle becomes more accurate. Therefore, the error rate of the touch position detection is reduced and the user experience is improved.

Figure 18:
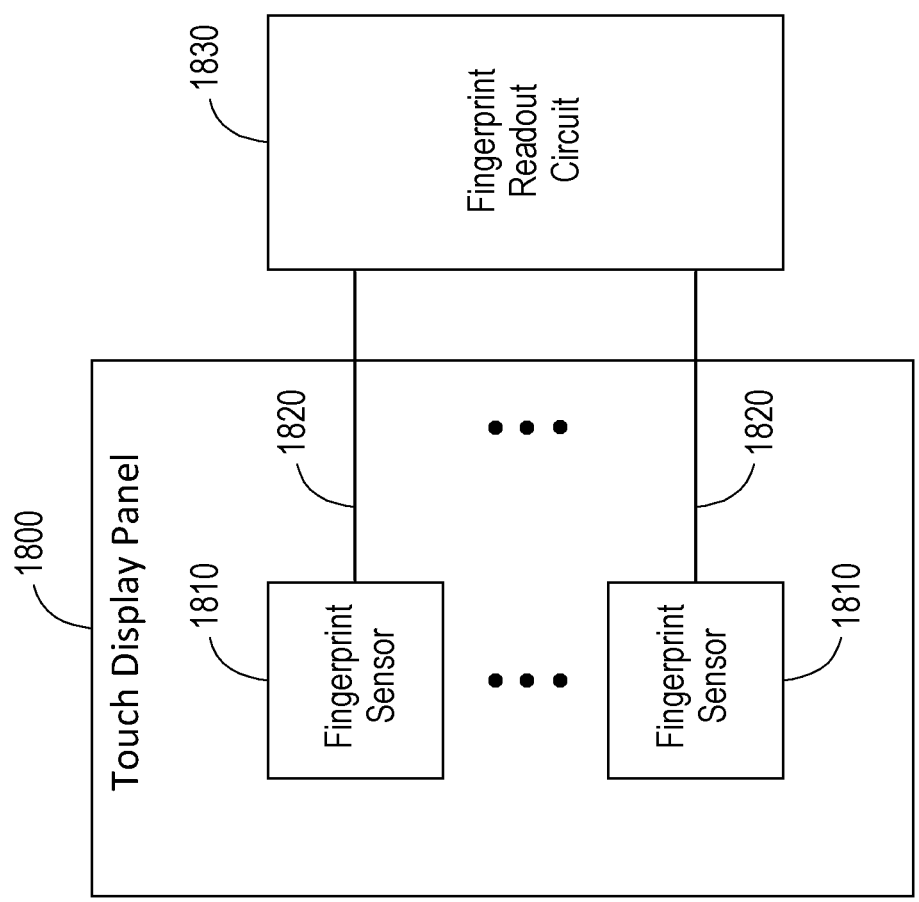
FIG. 18 is a schematic diagram of a touch display panel according to one embodiment of the disclosure.

FIG. 18 is a schematic diagram of a touch display panel according to one embodiment of the disclosure. Referring to FIG. 2, FIG. 8 and FIG. 18, a touch display panel 1800 may include a plurality of sensing lines 1820, a plurality of fingerprint sensors 1810. The plurality of fingerprint sensors 1810 may be configured to operate in a fingerprint sensing cycle. The plurality of fingerprint sensors 1810 may be coupled to a fingerprint readout circuit 1830 via the sensing lines 1820. The fingerprint sensing cycle includes an initialization period P_INIT, an exposure period P_EXP and a readout period P_READ. A voltage VP of a reset node P in each fingerprint sensor 1810 among the fingerprint sensors

1810 may be reset to a first voltage in a reset period P_RST after the fingerprint sensing cycle ends. The voltage VP of the reset node P in each fingerprint sensor 1810 may be initialized to an initial voltage in the initialization period P_INIT. The initial voltage is different from the first voltage.

In one embodiment, a sensing voltage (the output of fingerprint sensor 200) of each fingerprint sensors 1810 may be readout by the fingerprint readout circuit 1830 via the corresponding sensing line 1820. The sensing voltage of each fingerprint sensor 1810 follows the voltage VP of the reset node P. A sensing result of each fingerprint sensors 1810 may be generated by the fingerprint readout circuit 1830 for the fingerprint sensing cycle based on a voltage variation between the initial voltage and the sensing voltage.

In one embodiment, referring to FIG. 17 and FIG. 18, the touch display panel 1800 may further comprise a gate on array circuit 1730 for fingerprint sensing control. The gate on array circuit 1730 may receive at least one start pulse signal STV and a clock signal CLK from the fingerprint readout circuit 1830. The gate on array circuit 1730 may output reset signals RST according to the at least one start pulse signal STV and the clock signal CLK. The reset signals RST may be configured to reset at least one fingerprint sensing zone of the fingerprint sensors 1810 arranged in the sensor array 1720 row by row in the reset period P_RST.

In one embodiment, referring to FIG. 17 and FIG. 18, the touch display panel 1800 may further comprise a gate on array circuit 1730 for fingerprint sensing control. The gate on array circuit 1730 may receive at least one start pulse signal STV, a clock signal CLK and a control signal SIM from the fingerprint readout circuit 1830. The gate on array circuit 1730 may output reset signals RST according to the at least one start pulse signal STV, the clock signal CLK and the control signal SIM. According to the control signal SIM, the reset signals RST generated by the gate on array circuit can be configured to simultaneously reset at least one fingerprint sensing zone of the fingerprint sensors 1810 arranged in the sensor array 1720 in the reset period P_RST.

In one embodiment, referring to FIG. 17 and FIG. 18, the touch display panel 1800 may further comprise a gate on array circuit 1730 for fingerprint sensing control. The gate on array circuit 1730 may receive at least one start pulse signal STV and a clock signal CLK from the fingerprint readout circuit 1830. The gate on array circuit 1730 may outputs selecting signals SEL according to the at least one start pulse signal STV and the clock signal CLK. The selecting signals SEL may be configured to row-by-row read out sensing voltages of at least one fingerprint sensing zone of the fingerprint sensors 1810 arranged in the sensor array 1720 in the readout period P_READ. In this embodiment, the fingerprint readout circuit 1830 does not necessarily to provide the aforementioned control signal SIM to the gate on array circuit 1730.

In this manner, the reset period P_RST may be arranged after the fingerprint sensing cycle to reset the voltage VP of the reset node P of the fingerprint sensors 1810, and as a result, the touch sensing data got in touch display frame periods right after the fingerprint sensing cycle becomes more accurate. Therefore, the error rate of the touch position detection is reduced and the user experience is improved.

In summary, according to the fingerprint sensing apparatus, the fingerprint readout circuit, and the touch display panel of the disclosure, the reset period is arranged after the fingerprint sensing cycle to reset the voltage of the reset node of the fingerprint sensors. Consequently, the error rate of the touch position detection is reduced and the user experience is improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fingerprint sensing apparatus, comprising:
   a plurality of fingerprint sensors, configured to operate in a fingerprint sensing cycle; and
   a fingerprint readout circuit, coupled to the plurality of fingerprint sensors via a plurality of sensing lines, and configured to control the plurality of fingerprint sensors to operate in the fingerprint sensing cycle,
   wherein the fingerprint sensing cycle includes an initialization period, an exposure period, and a readout period,
   a voltage of a reset node in each fingerprint sensor among the plurality of fingerprint sensors is reset to a first voltage in a reset period after the fingerprint sensing cycle ends,
   the voltage of the reset node in each fingerprint sensor is initialized to an initial voltage in the initialization period, and
   the initial voltage is different from the first voltage,
   wherein the initial voltage is larger than the first voltage,
   wherein a voltage of the reset node at the end of the initialization period is equal to a voltage of the reset node at the beginning of the exposure period.

2. The fingerprint sensing apparatus of claim 1, wherein the fingerprint readout circuit reads out a sensing voltage of each fingerprint sensor via the corresponding sensing line in the readout period,
   wherein the sensing voltage follows the voltage of the reset node, and
   the fingerprint readout circuit generates a sensing result of each fingerprint sensor based on a voltage variation between the initial voltage and the sensing voltage.

3. The fingerprint sensing apparatus of claim 1, wherein the reset node is electrically coupled to a power supply node supplied with a voltage signal,
   wherein the voltage signal is kept at the first voltage in the reset period, and
   the voltage signal is kept at the initial voltage in the initialization period.

4. The fingerprint sensing apparatus of claim 3, wherein the fingerprint readout circuit is configured to output the voltage signal to a touch display panel.

5. The fingerprint sensing apparatus of claim 1, wherein the initialization period of the fingerprint sensing cycle is in a first frame period,
   the readout period of the fingerprint sensing cycle is in a second frame period different from the first frame period, and
   a time length between the initialization period and the readout period comprises one or more frame periods,
   wherein in the one or more frame periods between the initialization period and the readout period, at least one of a display function and a touch sensing function is enabled and a fingerprint sensing function is disabled.

6. The fingerprint sensing apparatus of claim 1, wherein a time length between the fingerprint sensing cycle and the reset period comprises one or more frame periods, wherein in the one or more frame periods between the fingerprint sensing cycle and the reset period, at least one of a display function and a touch sensing function is enabled and a fingerprint sensing function is disabled, and the plurality of fingerprint sensors are reset row by row in the reset period.

7. The fingerprint sensing apparatus of claim 1, wherein the readout period of the fingerprint sensing cycle and the reset period belong to a same frame period, and the plurality of fingerprint sensors are reset simultaneously.

8. The fingerprint sensing apparatus of claim 1, wherein the fingerprint sensing cycle and the reset period are performed in a porch interval, and the porch interval is located in two adjacent frame periods.

9. The fingerprint sensing apparatus of claim 8, wherein the plurality of fingerprint sensors are reset row by row in the reset period.

10. The fingerprint sensing apparatus of claim 8, wherein the plurality of fingerprint sensors are reset simultaneously.

11. The fingerprint sensing apparatus of claim 1, wherein the fingerprint sensing cycle is completely performed by a plurality of first porch intervals, and the reset period is in a second porch interval coming after the plurality of first porch intervals, wherein any of the plurality of first porch intervals and the second porch interval is located in two adjacent frame periods.

12. The fingerprint sensing apparatus of claim 1, wherein the plurality of fingerprint sensors arranged in an array are located in a touch display panel, and the touch display panel comprises a gate on array circuit, wherein the fingerprint readout circuit outputs at least one start pulse signal and a clock signal to the gate on array circuit, and the gate on array circuit outputs reset signals according to the at least one start pulse signal and the clock signal, wherein the reset signals are configured to reset at least one fingerprint sensing zone of the plurality of fingerprint sensors arranged in the array row by row in the reset period.

13. The fingerprint sensing apparatus of claim 1, wherein the plurality of fingerprint sensors arranged in an array are located in a touch display panel, and the touch display panel comprises a gate on array circuit, wherein the fingerprint readout circuit outputs at least one start pulse signal, a clock signal and a control signal to the gate on array circuit, and the gate on array circuit outputs reset signals according to the at least one start pulse signal, the clock signal and the control signal, wherein the reset signals are configured to simultaneously reset at least one fingerprint sensing zone of the plurality of fingerprint sensors arranged in the array in the reset period.

14. The fingerprint sensing apparatus of claim 1, wherein the plurality of fingerprint sensors arranged in an array are located in a touch display panel, and the touch display panel comprises a gate on array circuit, wherein the fingerprint readout circuit outputs at least one start pulse signal and a clock signal to the gate on array circuit, and the gate on array circuit outputs selecting signals according to the at least one start pulse signal and the clock signal, wherein the selecting signals are configured to row-by-row read out sensing voltages of at least one fingerprint sensing zone of the plurality of fingerprint sensors arranged in the array in the readout period.

15. A fingerprint readout circuit, configurable to be coupled to a touch display panel, wherein the touch display panel comprises a plurality of fingerprint sensors arranged in an array and a gate on array circuit, and the fingerprint readout circuit is coupled to the plurality of fingerprint sensors via a plurality of sensing lines, and coupled to the gate on array circuit; and the fingerprint readout circuit is configured to output at least one start pulse signal and at least one clock signal to control the gate on array circuit to output reset signals and selecting signals, wherein the reset signals and the selecting signals are configured to control at least one fingerprint sensing zone of the plurality of fingerprint sensors arranged in the array to operate in a fingerprint sensing cycle, wherein the fingerprint sensing cycle includes an initialization period, an exposure period and a readout period, and wherein according to the reset signals, a voltage of a reset node in each fingerprint sensor among the plurality of fingerprint sensors is reset to a first voltage in a reset period after the fingerprint sensing cycle ends, the voltage of the reset node in each fingerprint sensor is initialized to an initial voltage in the initialization period, and the initial voltage is different from the first voltage, wherein the initial voltage is larger than the first voltage, wherein a voltage of the reset node at the end of the initialization period is equal to a voltage of the reset node at the beginning of the exposure period.

16. The fingerprint readout circuit of claim 15, wherein the fingerprint readout circuit reads out a sensing voltage of each fingerprint sensor via the corresponding sensing line in the readout period, wherein the sensing voltage follows the voltage of the reset node, and the fingerprint readout circuit generates a sensing result of each fingerprint sensor based on a voltage variation between the initial voltage and the sensing voltage.

17. The fingerprint readout circuit of claim 15, wherein the fingerprint readout circuit is configured to output a voltage signal to the touch display panel, wherein the voltage signal is kept at the first voltage in the reset period, and the voltage signal is kept at the initial voltage in the initialization period.

18. The fingerprint readout circuit of claim 17, wherein the reset node is electrically coupled to a power supply node supplied with the voltage signal.

19. The fingerprint readout circuit of claim 15, wherein the initialization period of the fingerprint sensing cycle is in a first frame period, the readout period of the fingerprint sensing cycle is in a second frame period different from the first frame period, and a time length between the initialization period and the readout period comprises one or more frame periods, wherein in the one or more frame periods between the initialization period and the readout period, at least one of a display function and a touch sensing function is enabled and a fingerprint sensing function is disabled.

20. The fingerprint readout circuit of claim 15, wherein
a time length between the fingerprint sensing cycle and the reset period comprises one or more frame periods,
wherein in the one or more frame periods between the fingerprint sensing cycle and the reset period, at least one of a display function and a touch sensing function is enabled and a fingerprint sensing function is disabled, and
the plurality of fingerprint sensors are reset row by row in the reset period.

21. The fingerprint readout circuit of claim 15, wherein
the readout period of the fingerprint sensing cycle and the reset period belong to a same frame period, and
the plurality of fingerprint sensors are reset simultaneously.

22. The fingerprint readout circuit of claim 15, wherein
the fingerprint sensing cycle and the reset period are performed in a porch interval, and
the porch interval is located in two adjacent frame periods.

23. The fingerprint readout circuit of claim 22, wherein the plurality of fingerprint sensors are reset row by row in the reset period.

24. The fingerprint readout circuit of claim 22, wherein the plurality of fingerprint sensors are reset simultaneously.

25. The fingerprint readout circuit of claim 15, wherein
the fingerprint sensing cycle is completely performed by a plurality of first porch intervals, and
the reset period is in a second porch interval coming after the plurality of first porch intervals,
wherein any of the plurality of first porch intervals and the second porch interval is located in two adjacent frame periods.

26. The fingerprint readout circuit of claim 15, wherein
the fingerprint readout circuit outputs at least one start pulse signal and a clock signal to the gate on array circuit, and
the gate on array circuit outputs reset signals according to the at least one start pulse signal and the clock signal,
wherein the reset signals are configured to reset at least one fingerprint sensing zone of the plurality of fingerprint sensors arranged in the array row by row in the reset period.

27. The fingerprint readout circuit of claim 15, wherein
the fingerprint readout circuit outputs at least one start pulse signal, a clock signal and a control signal to the gate on array circuit, and
the gate on array circuit outputs reset signals according to the at least one start pulse signal, the clock signal and the control signal,
wherein the reset signals are configured to simultaneously reset at least one fingerprint sensing zone of the plurality of fingerprint sensors arranged in the array in the reset period.

28. The fingerprint readout circuit of claim 15, wherein
the fingerprint readout circuit outputs at least one start pulse signal and a clock signal to the gate on array circuit, and
the gate on array circuit outputs selecting signals according to the at least one start pulse signal and the clock signal,
wherein the selecting signals are configured to row-by-row read out sensing voltages of at least one fingerprint sensing zone of the plurality of fingerprint sensors arranged in the array in the readout period.

29. A touch display panel, comprising:
a plurality of sensing lines; and
a plurality of fingerprint sensors, configured to operate in a fingerprint sensing cycle, and coupled to a fingerprint readout circuit via the plurality of sensing lines,
wherein the fingerprint sensing cycle includes an initialization period, an exposure period and a readout period,
a voltage of a reset node in each fingerprint sensor among the plurality of fingerprint sensors is reset to a first voltage in a reset period after the fingerprint sensing cycle ends,
the voltage of the reset node in each fingerprint sensor is initialized to an initial voltage in the initialization period, and
the initial voltage is different from the first voltage,
wherein the initial voltage is larger than the first voltage,
wherein a voltage of the reset node at the end of the initialization period is equal to a voltage of the reset node at the beginning of the exposure period.

30. The touch display panel of claim 29, wherein
a sensing voltage of each fingerprint sensors is readout by the fingerprint readout circuit via the corresponding sensing line,
wherein the sensing voltage of each fingerprint sensor follows the voltage of the reset node, and
a sensing result of each fingerprint sensors is generated by the fingerprint readout circuit for the fingerprint sensing cycle based on a voltage variation between the initial voltage and the sensing voltage.

31. The touch display panel of claim 29, wherein
the reset node is electrically coupled to a power supply node supplied with a voltage signal,
wherein the voltage signal is kept at the first voltage in the reset period and the voltage signal is kept at the initial voltage in the initialization period.

32. The touch display panel of claim 31, wherein the fingerprint readout circuit is configured to output the voltage signal to the touch display panel.

33. The touch display panel of claim 29, wherein
the initialization period of the fingerprint sensing cycle is in a first frame period,
the readout period of the fingerprint sensing cycle is in a second frame period different from the first frame period, and
a time length between the initialization period and the readout period comprises one or more frame periods,
wherein in the one or more frame periods between the initialization period and the readout period, at least one of a display function and a touch sensing function is enabled and a fingerprint sensing function is disabled.

34. The touch display panel of claim 29, wherein
a time length between the fingerprint sensing cycle and the reset period comprises one or more frame periods,
wherein in the one or more frame periods between the fingerprint sensing cycle and the reset period, at least one of a display function and a touch sensing function is enabled and a fingerprint sensing function is disabled, and
the plurality of fingerprint sensors are reset row by row in the reset period.

35. The touch display panel of claim 29, wherein
the readout period of the fingerprint sensing cycle and the reset period belong to a same frame period, and
the plurality of fingerprint sensors are reset simultaneously.

36. The touch display panel of claim 29, wherein
the fingerprint sensing cycle and the reset period are performed in a porch interval, and
the porch interval is located in two adjacent frame periods.

37. The touch display panel of claim 36, wherein the plurality of fingerprint sensors are reset row by row in the reset period.

38. The touch display panel of claim 36, wherein the plurality of fingerprint sensors are reset simultaneously.

39. The touch display panel of claim 29, wherein
the fingerprint sensing cycle is completely performed by a plurality of first porch intervals, and
the reset period is in a second porch interval coming after the plurality of first porch intervals,
wherein any of the plurality of first porch intervals and the second porch interval is located in two adjacent frame periods.

40. The touch display panel of claim 29, further comprising a gate on array circuit, wherein
the gate on array circuit receives at least one start pulse signal and a clock signal from the fingerprint readout circuit, and
the gate on array circuit outputs reset signals according to the at least one start pulse signal and the clock signal,
wherein the reset signals are configured to reset at least one fingerprint sensing zone of the plurality of fingerprint sensors arranged in an array row by row in the reset period.

41. The touch display panel of claim 29, further comprising a gate on array circuit, wherein
the gate on array circuit receives at least one start pulse signal, a clock signal and a control signal from the fingerprint readout circuit, and
the gate on array circuit outputs reset signals according to the at least one start pulse signal, the clock signal and the control signal,
wherein the reset signals are configured to simultaneously reset at least one fingerprint sensing zone of the plurality of fingerprint sensors arranged in an array in the reset period.

42. The touch display panel of claim 29, further comprising a gate on array circuit, wherein
the gate on array circuit receives at least one start pulse signal and a clock signal from the fingerprint readout circuit, and
the gate on array circuit outputs selecting signals according to the at least one start pulse signal and the clock signal,
wherein the selecting signals are configured to row-by-row read out sensing voltages of at least one fingerprint sensing zone of the plurality of fingerprint sensors arranged in an array in the readout period.

* * * * *